June 25, 1968  M. P. ELLIS ET AL  3,390,068
ELECTROCHEMICAL HONING APPARATUS INCLUDING BORE GAUGING MEANS
Original Filed Oct. 20, 1965  22 Sheets-Sheet 1

INVENTORS.
MYRON P. ELLIS
ROBERT C. ENGLE
ALBIN S. CZUBAK
BY  EVERETT A. RANDLETT JR.

Bower & Patalidis
ATTORNEYS

June 25, 1968  M. P. ELLIS ET AL  3,390,068
ELECTROCHEMICAL HONING APPARATUS INCLUDING BORE GAUGING MEANS
Original Filed Oct. 20, 1965  22 Sheets-Sheet 3

INVENTORS.
MYRON P. ELLIS
ROBERT C. ENGLE
ALBIN S. CZUBAK
BY EVERETT A. RANDLETT JR.

Bower & Patalidis

ATTORNEYS

INVENTORS.
MYRON P. ELLIS
ROBERT C. ENGLE
ALBIN S. CZUBAK
EVERETT A. RANDLETT JR.
BY Bower & Patalidis
ATTORNEYS

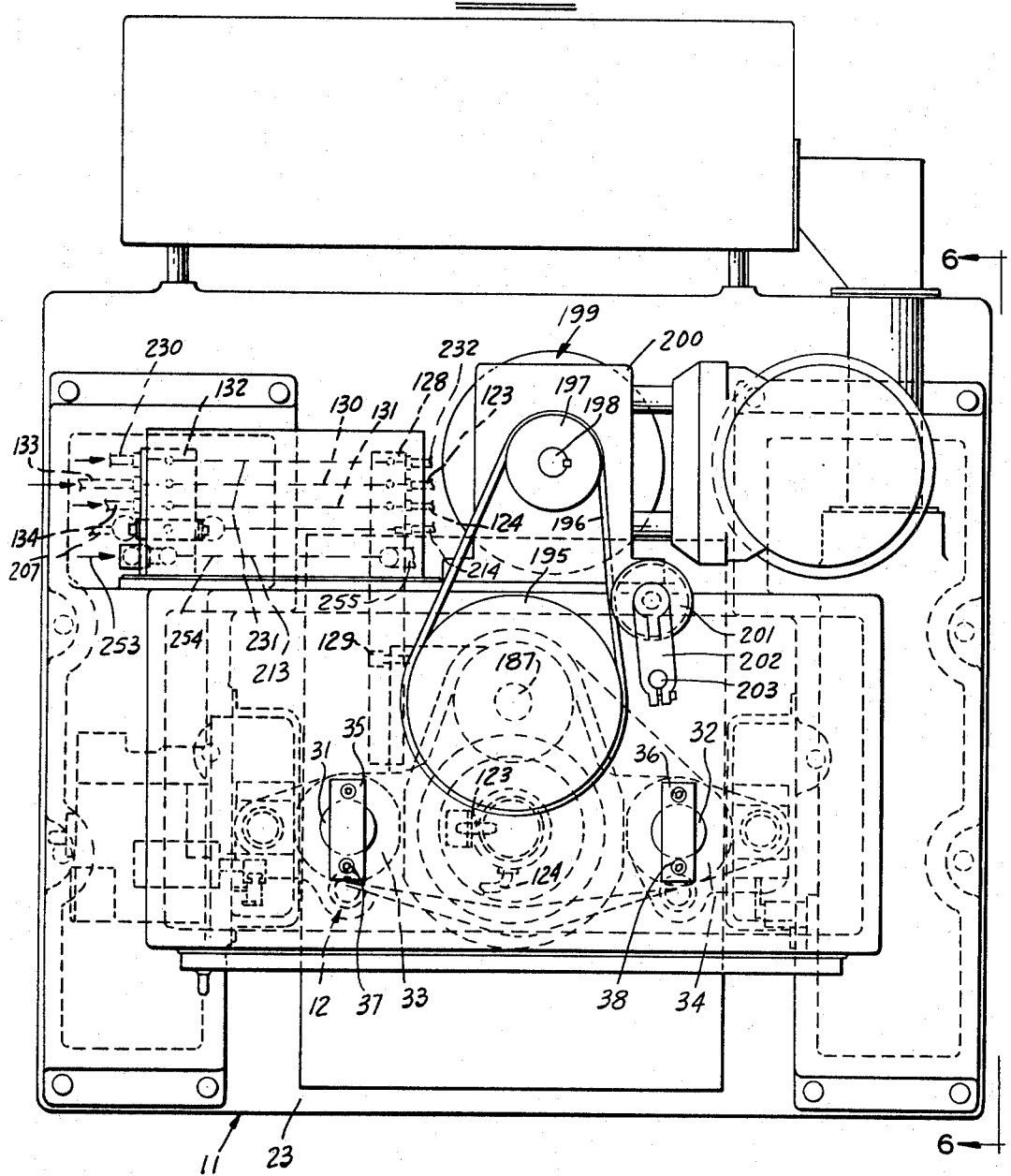

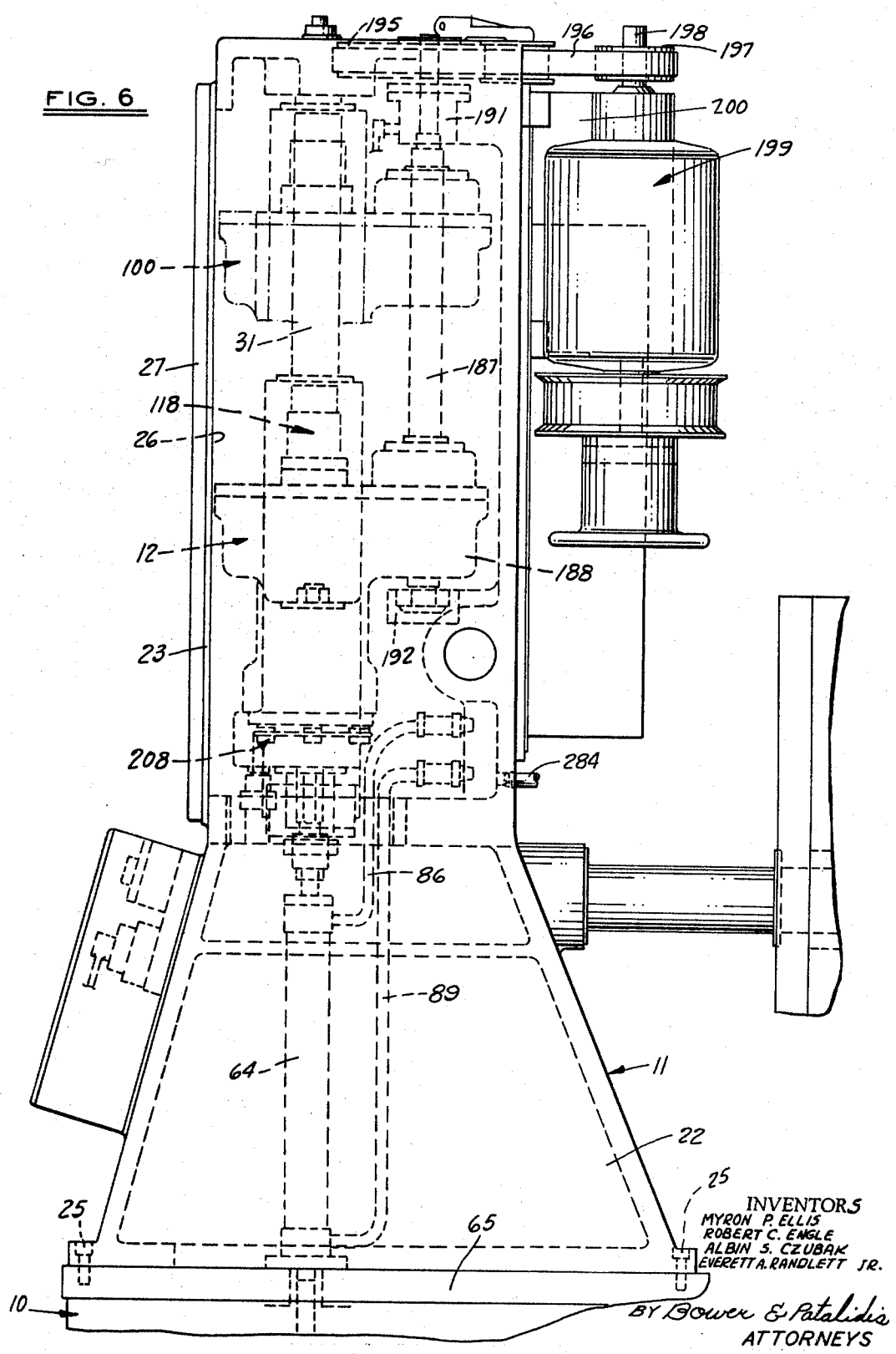

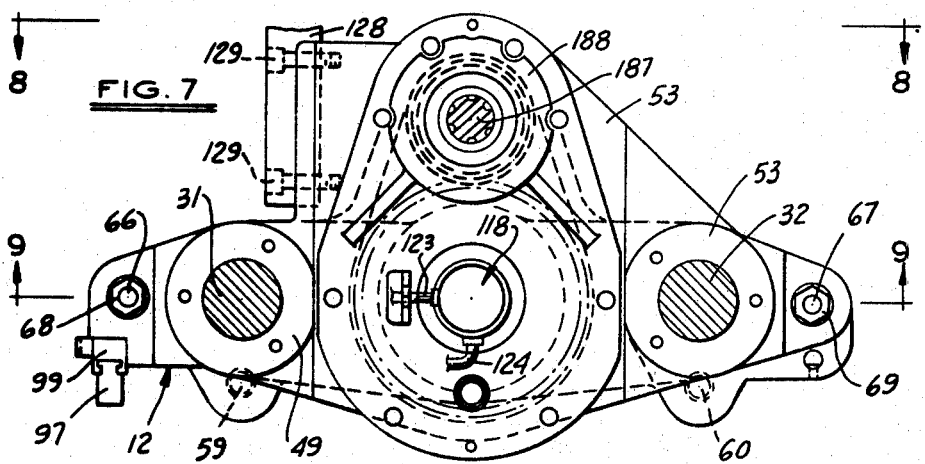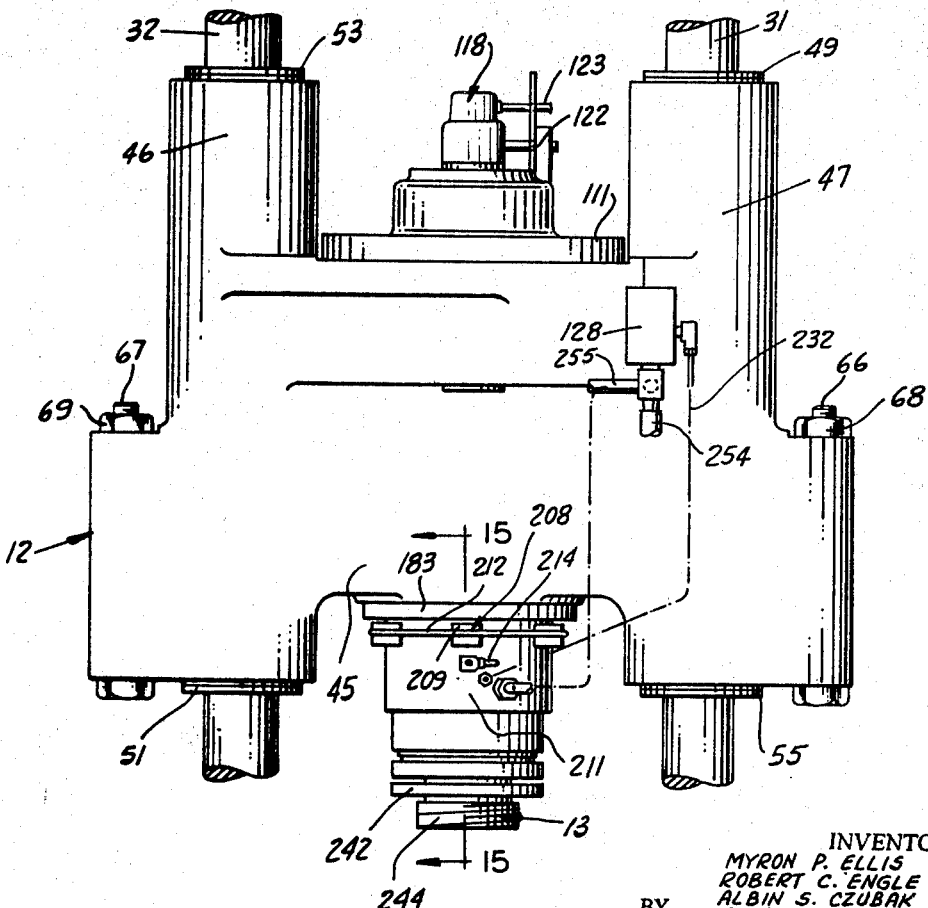

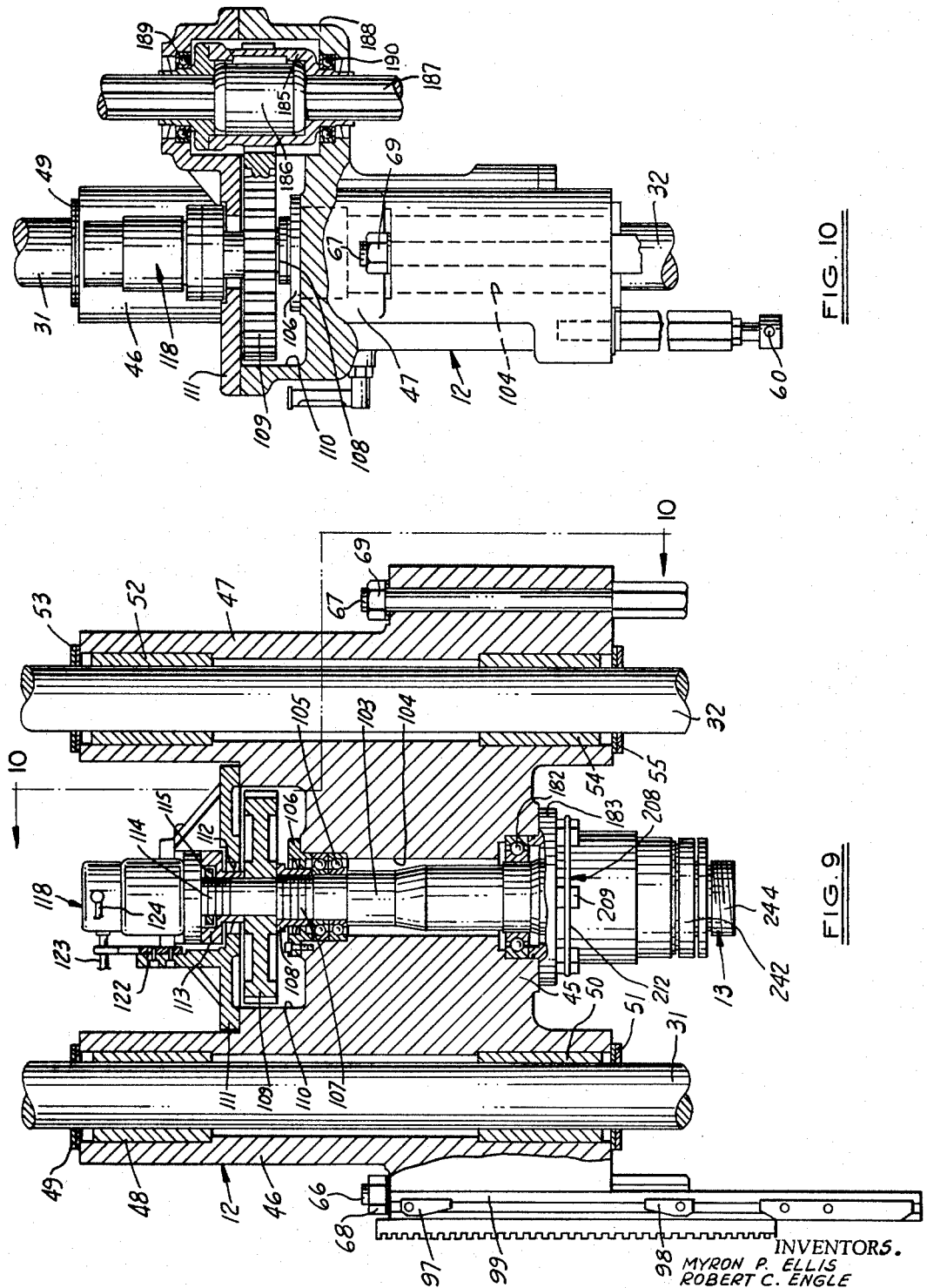

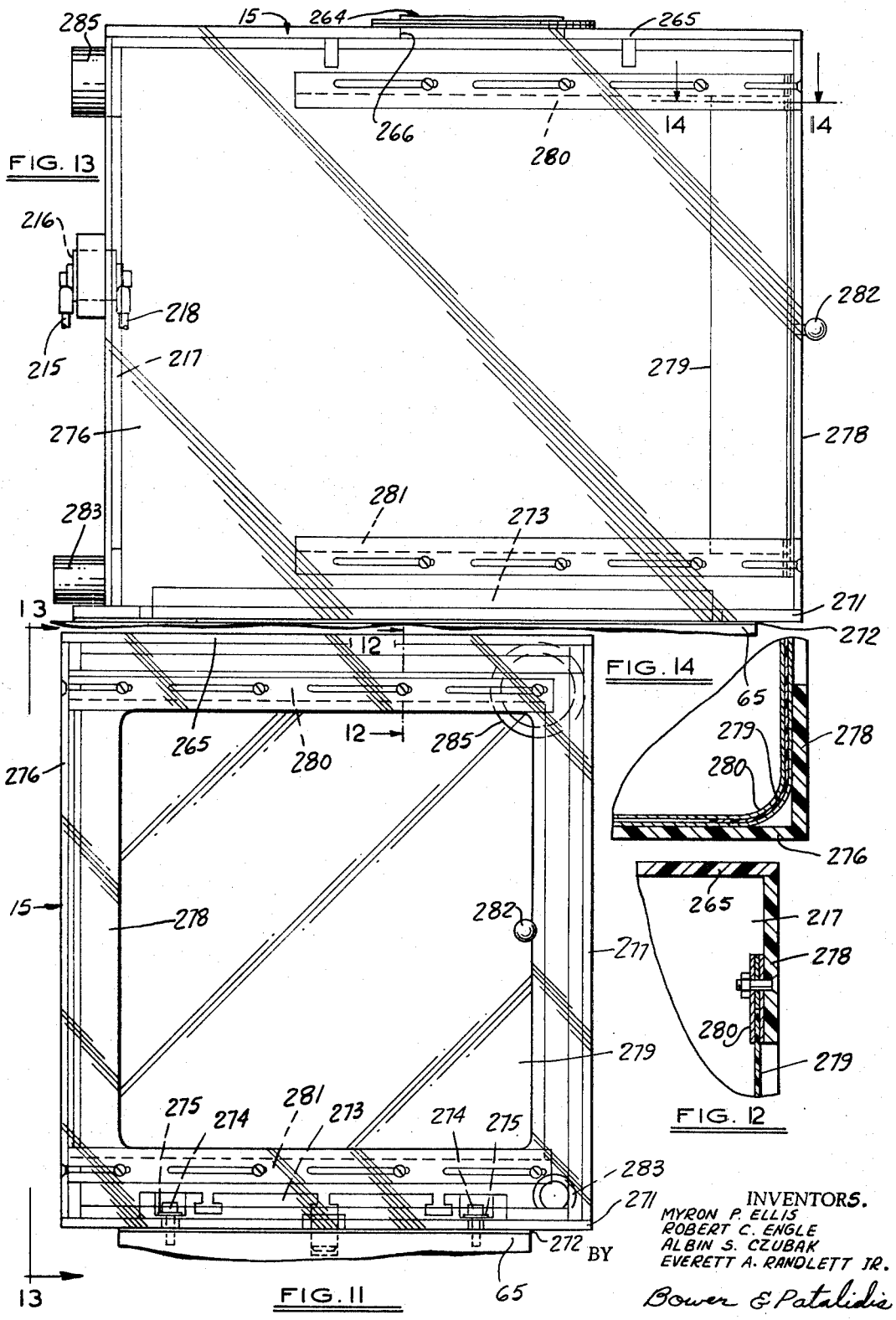

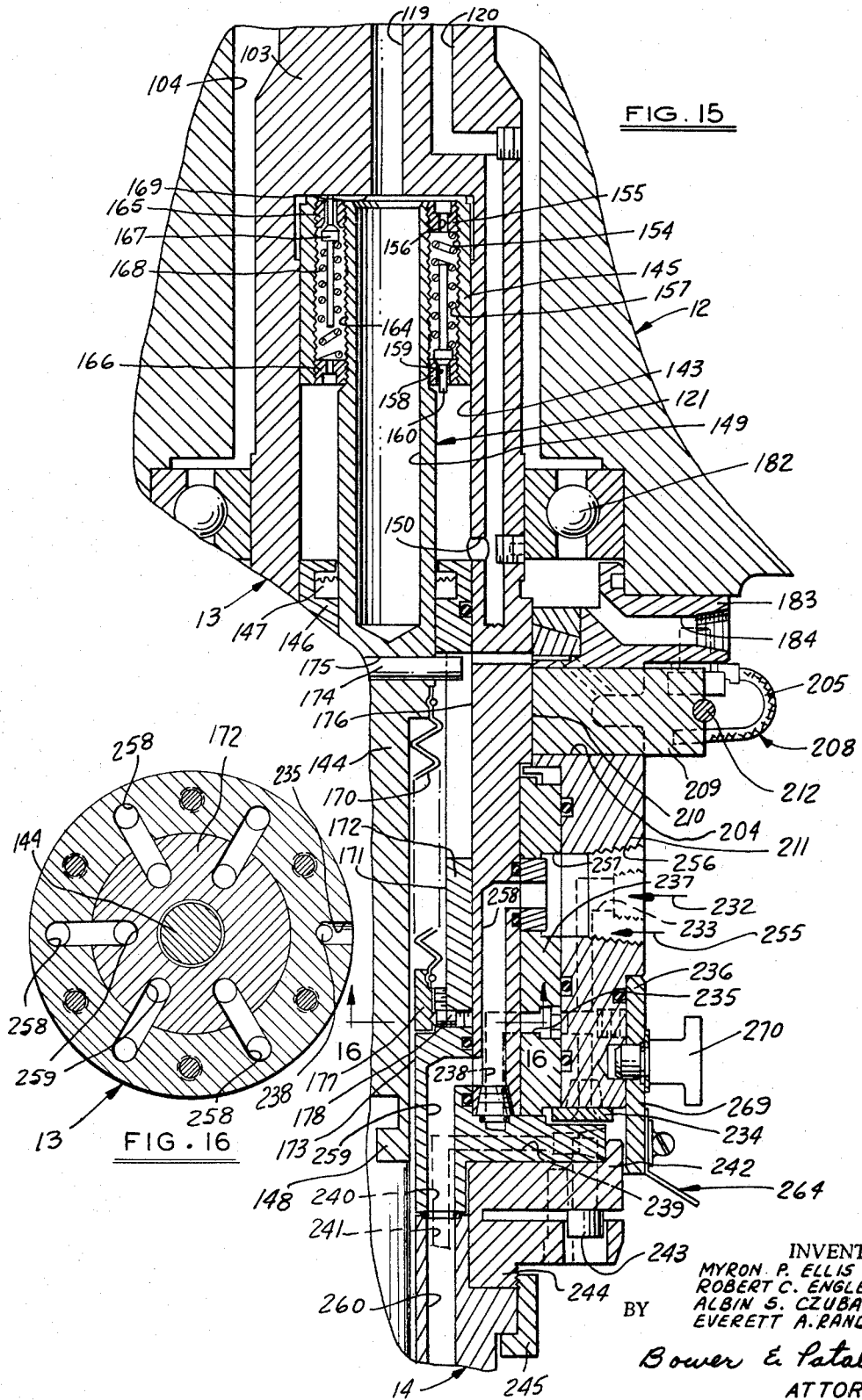

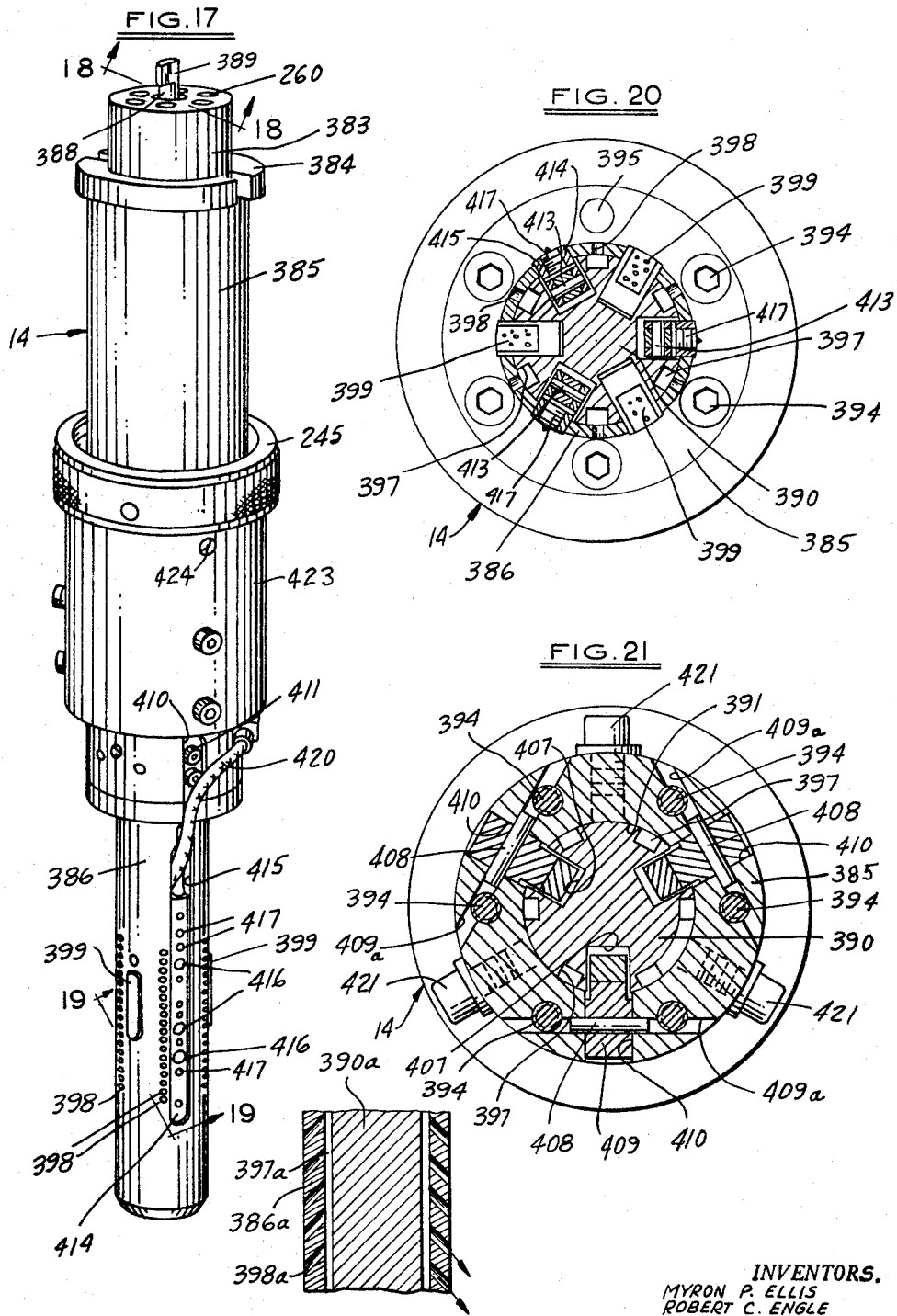

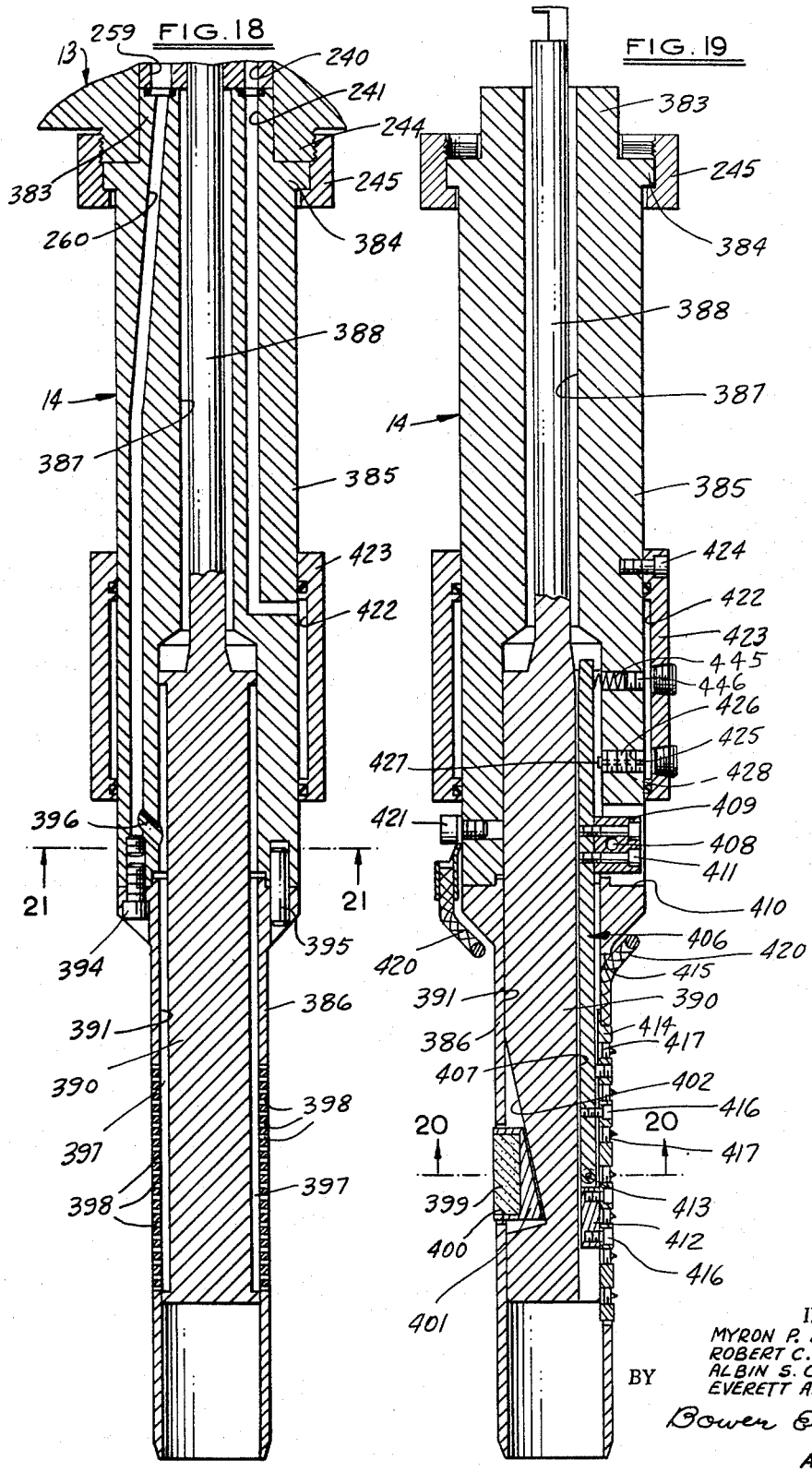

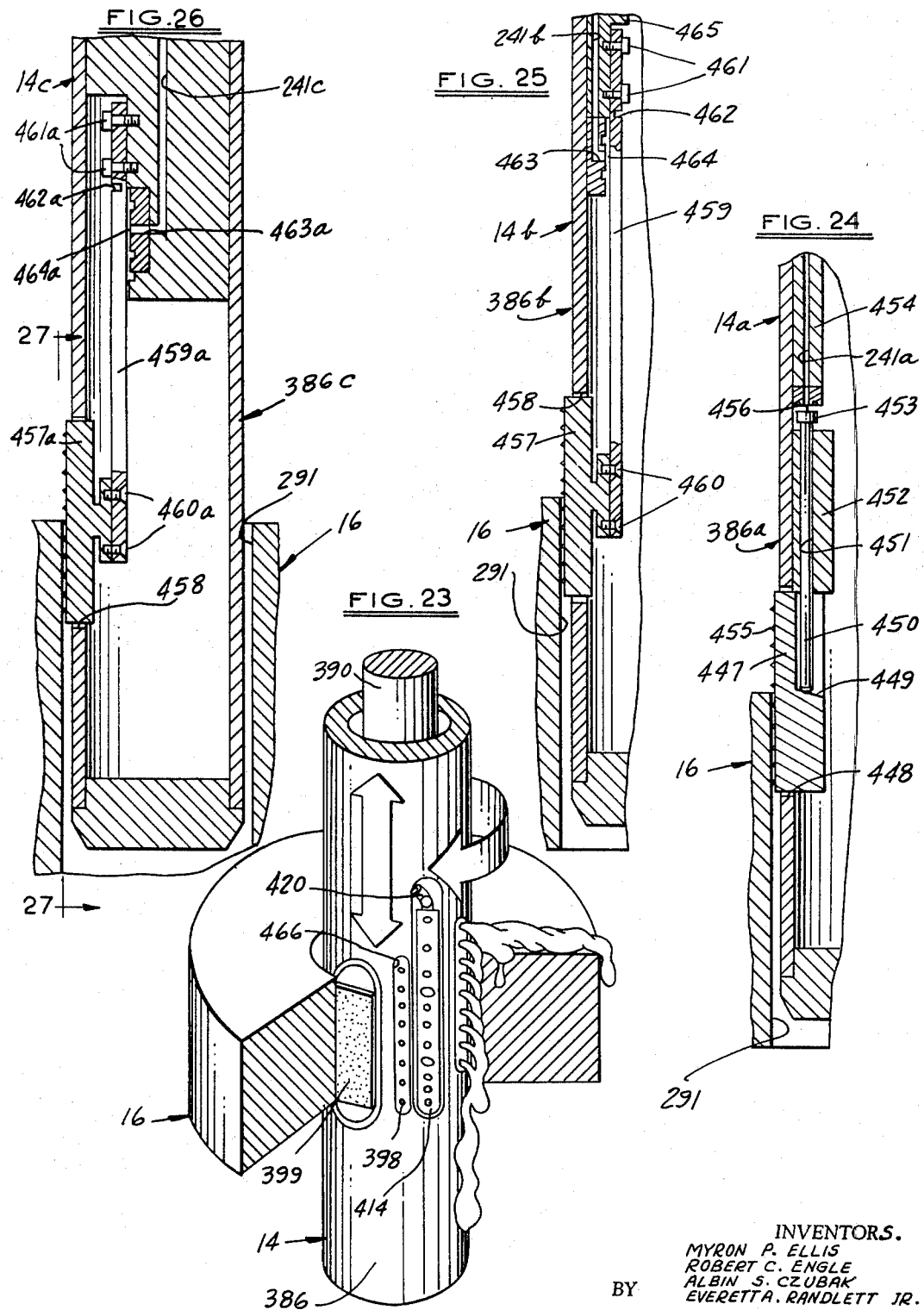

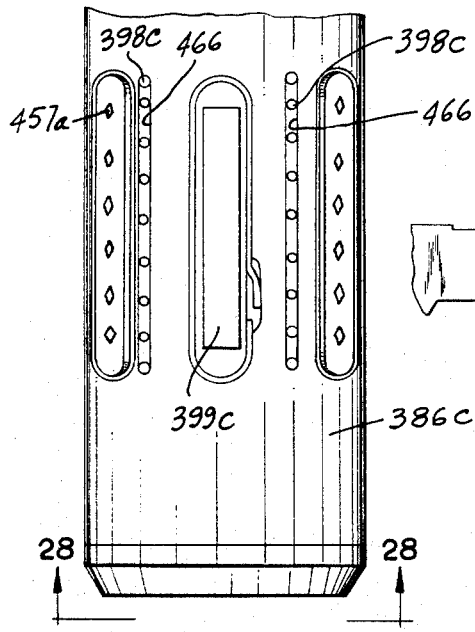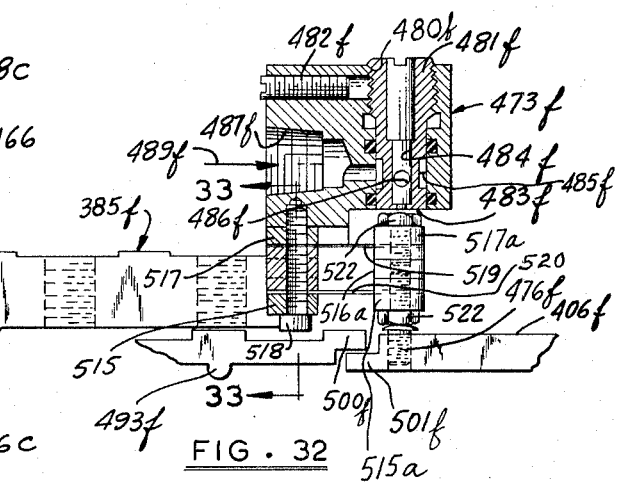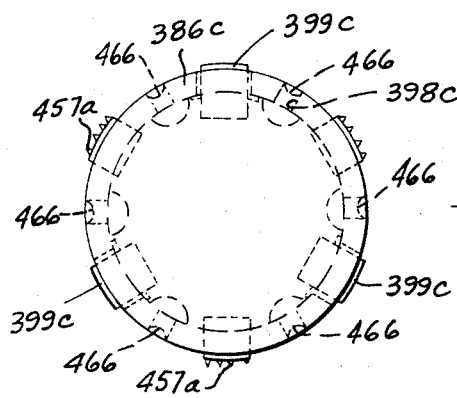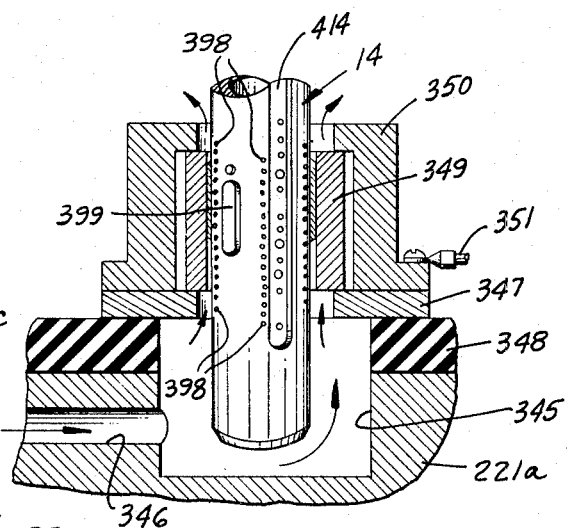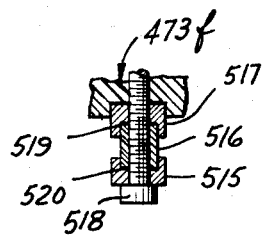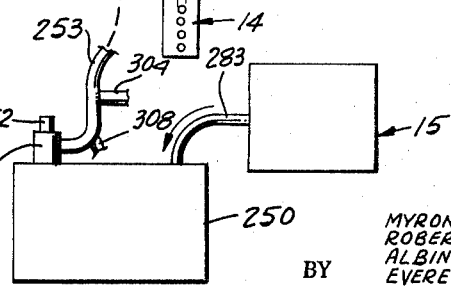

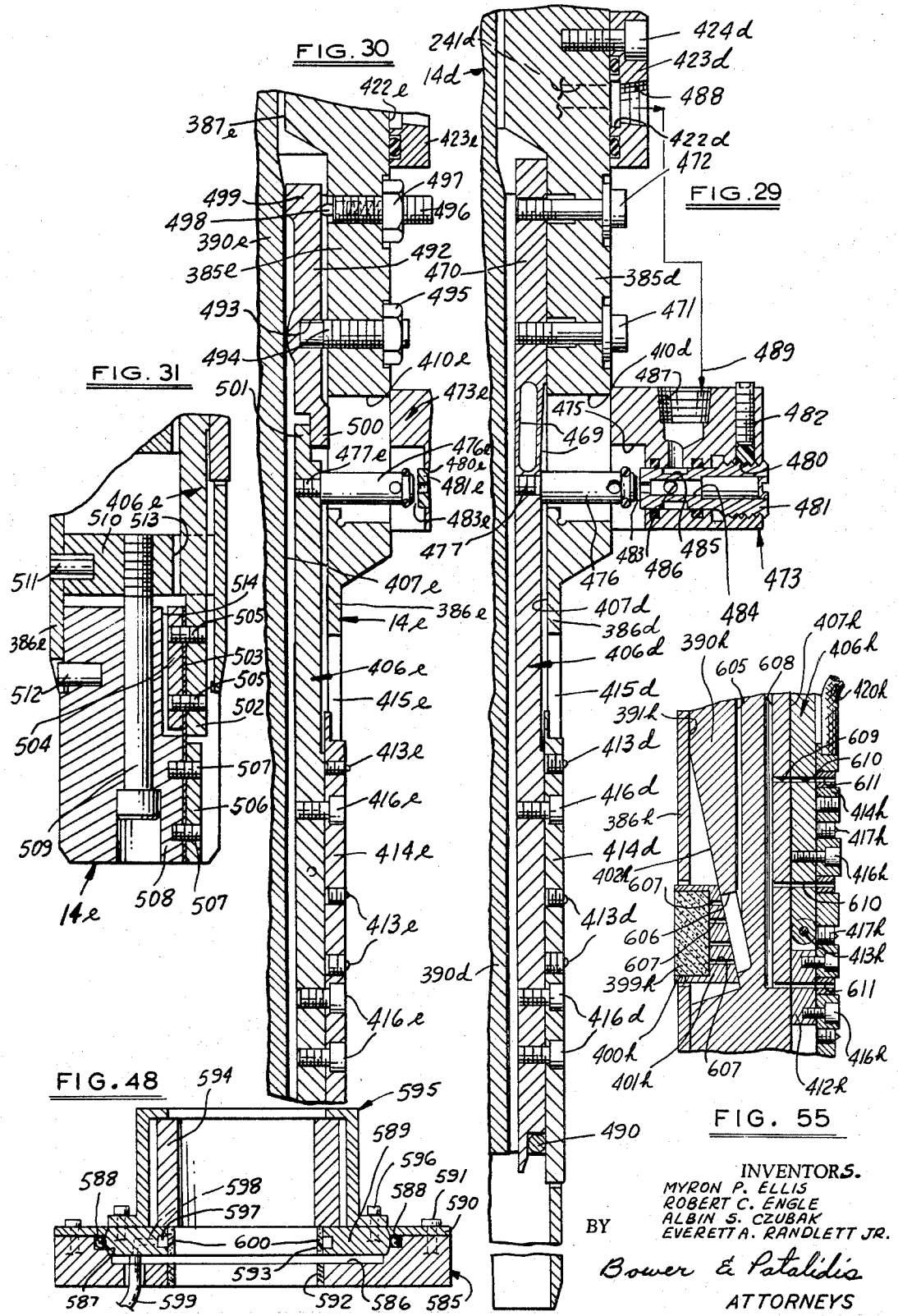

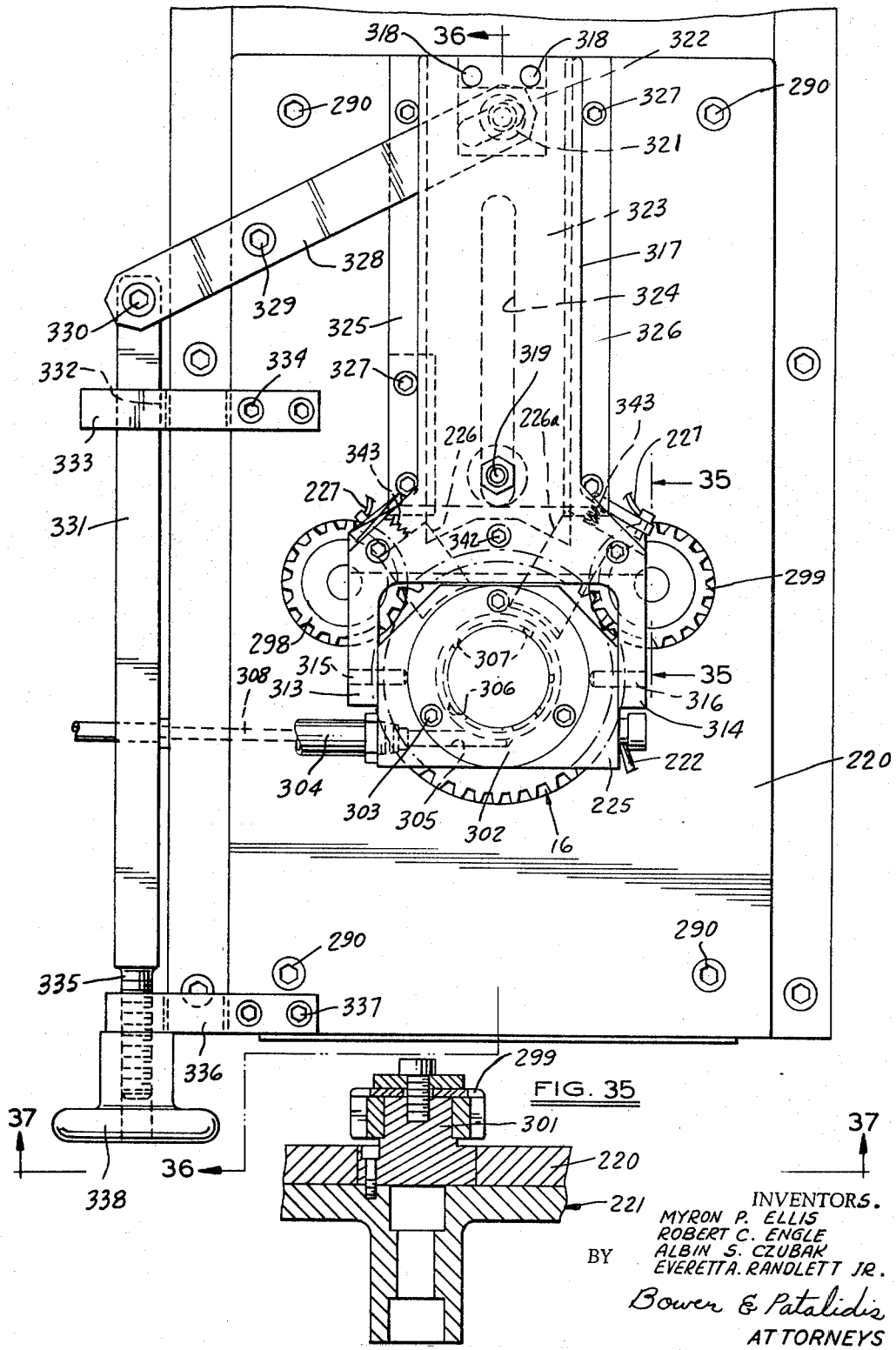

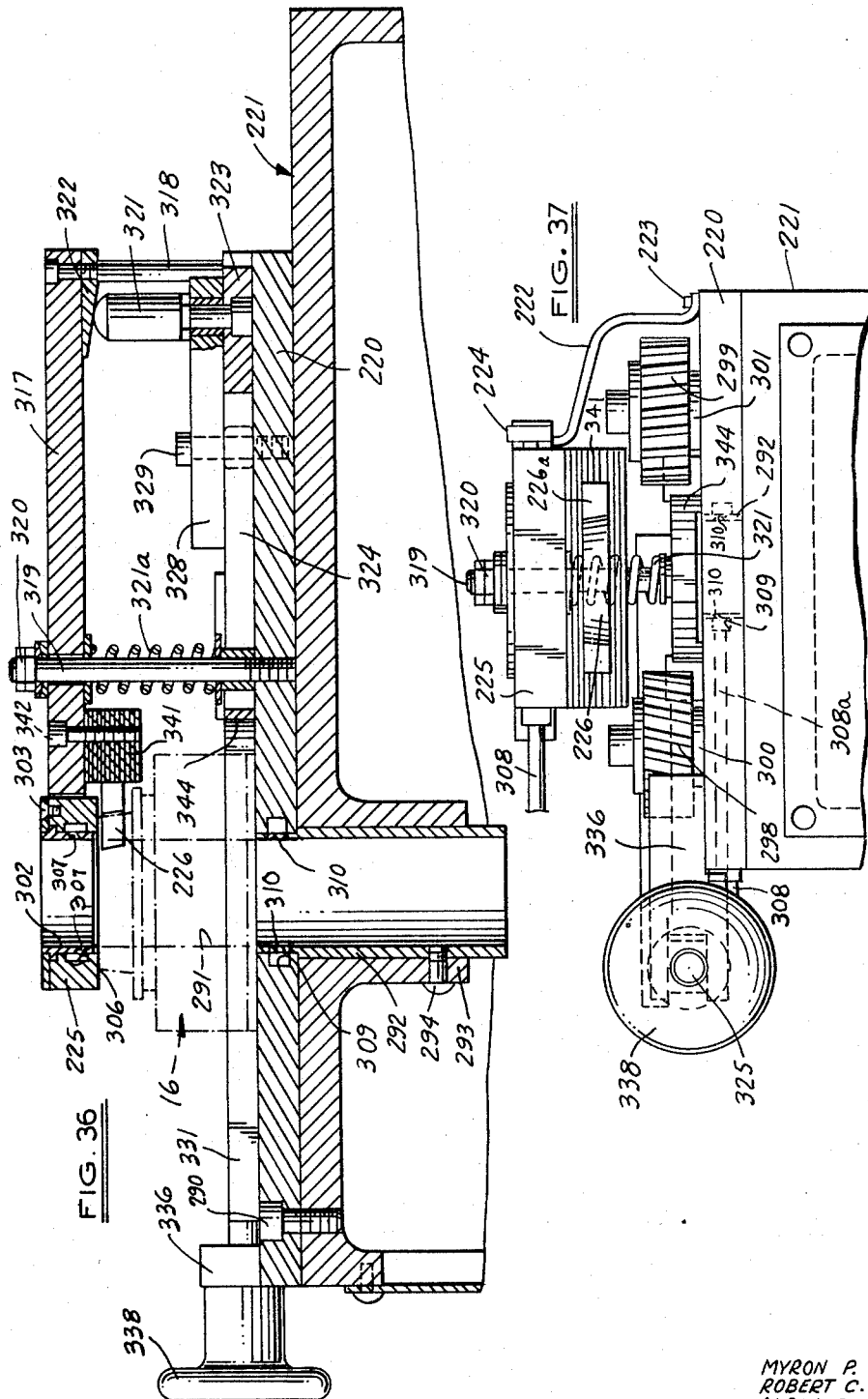

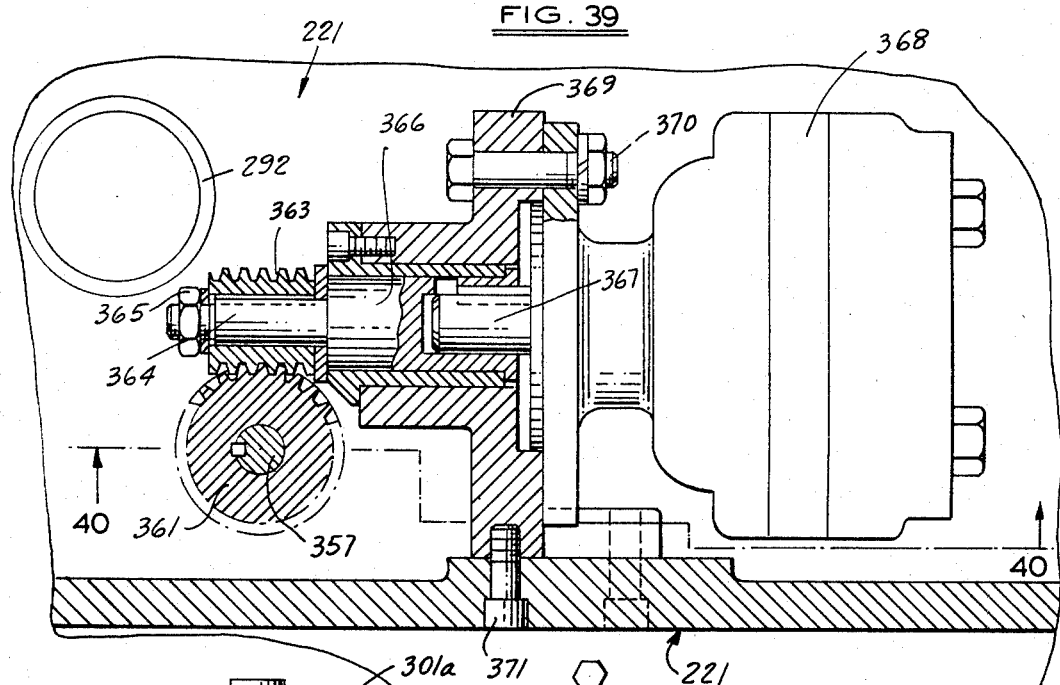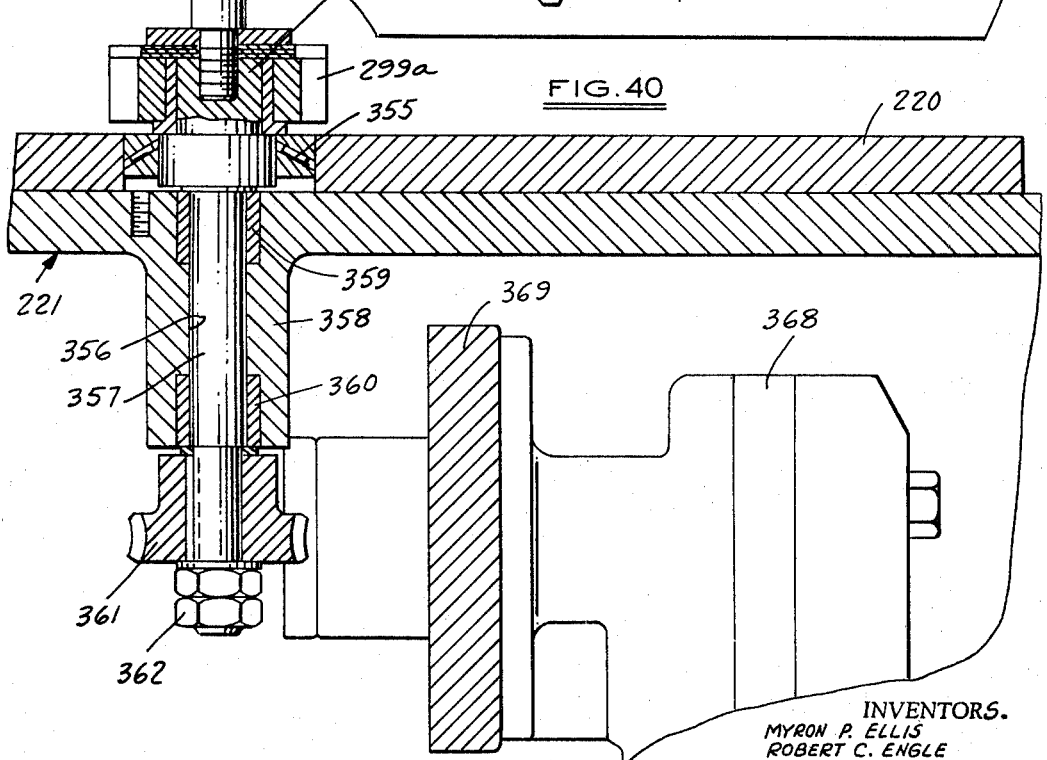

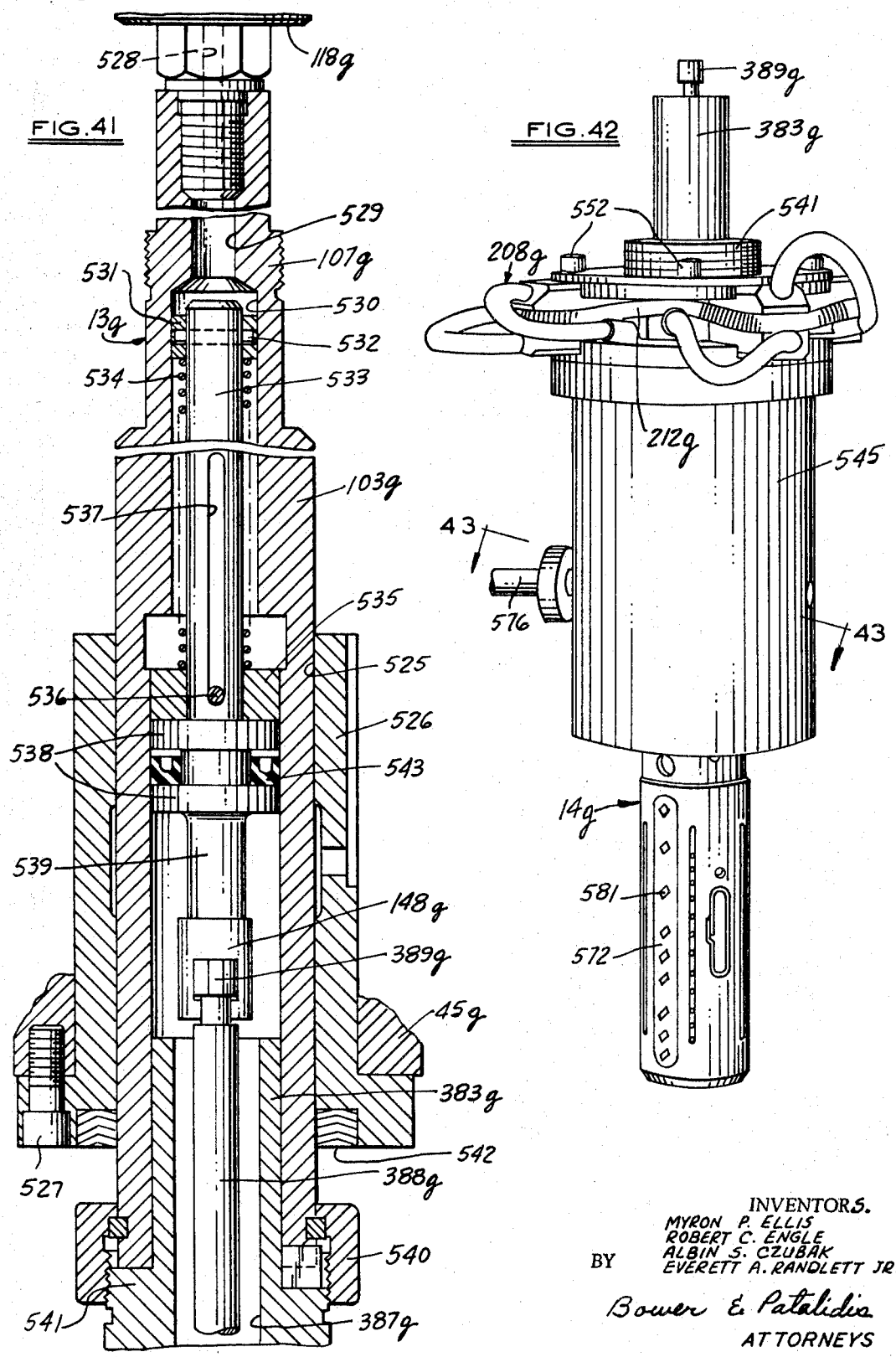

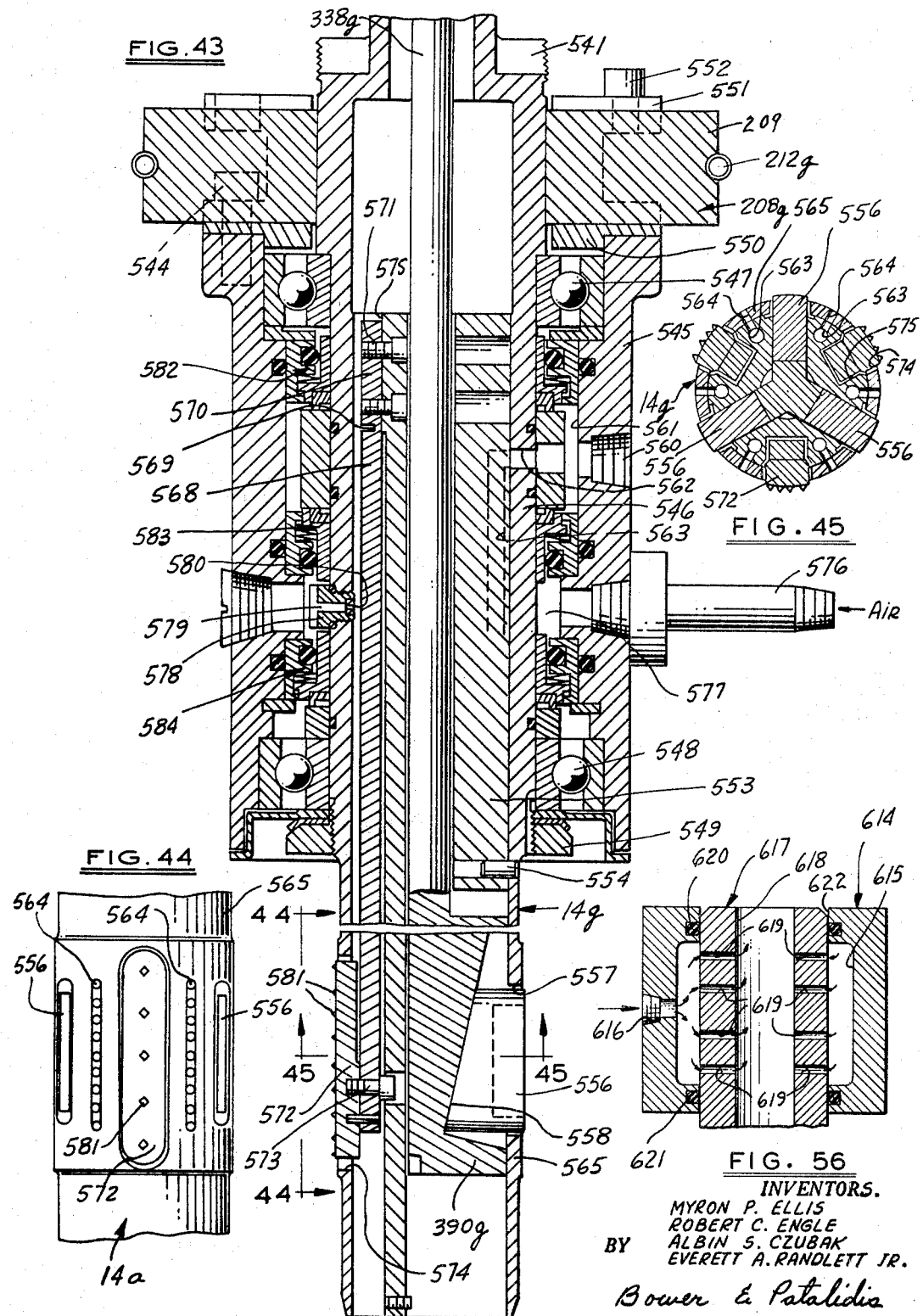

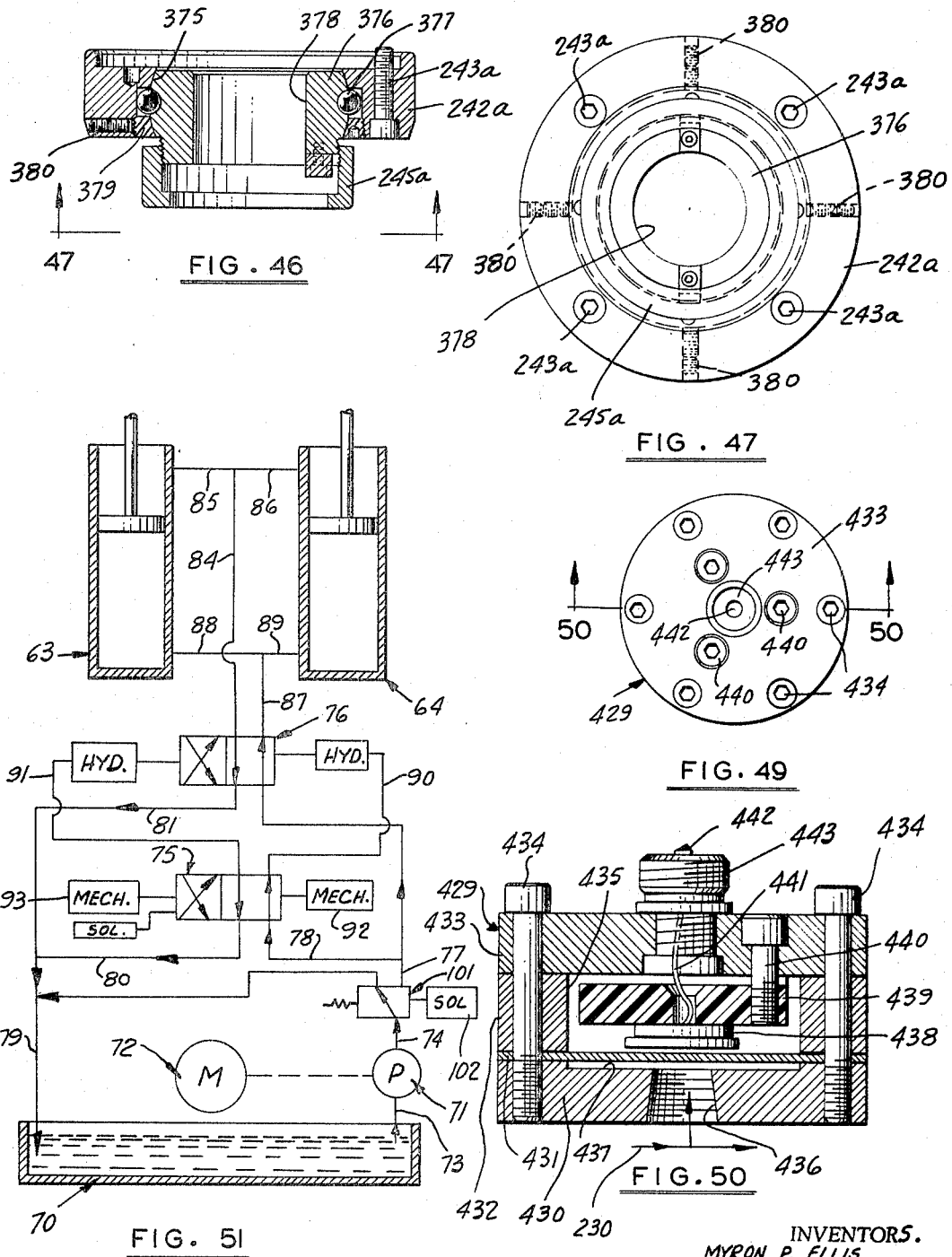

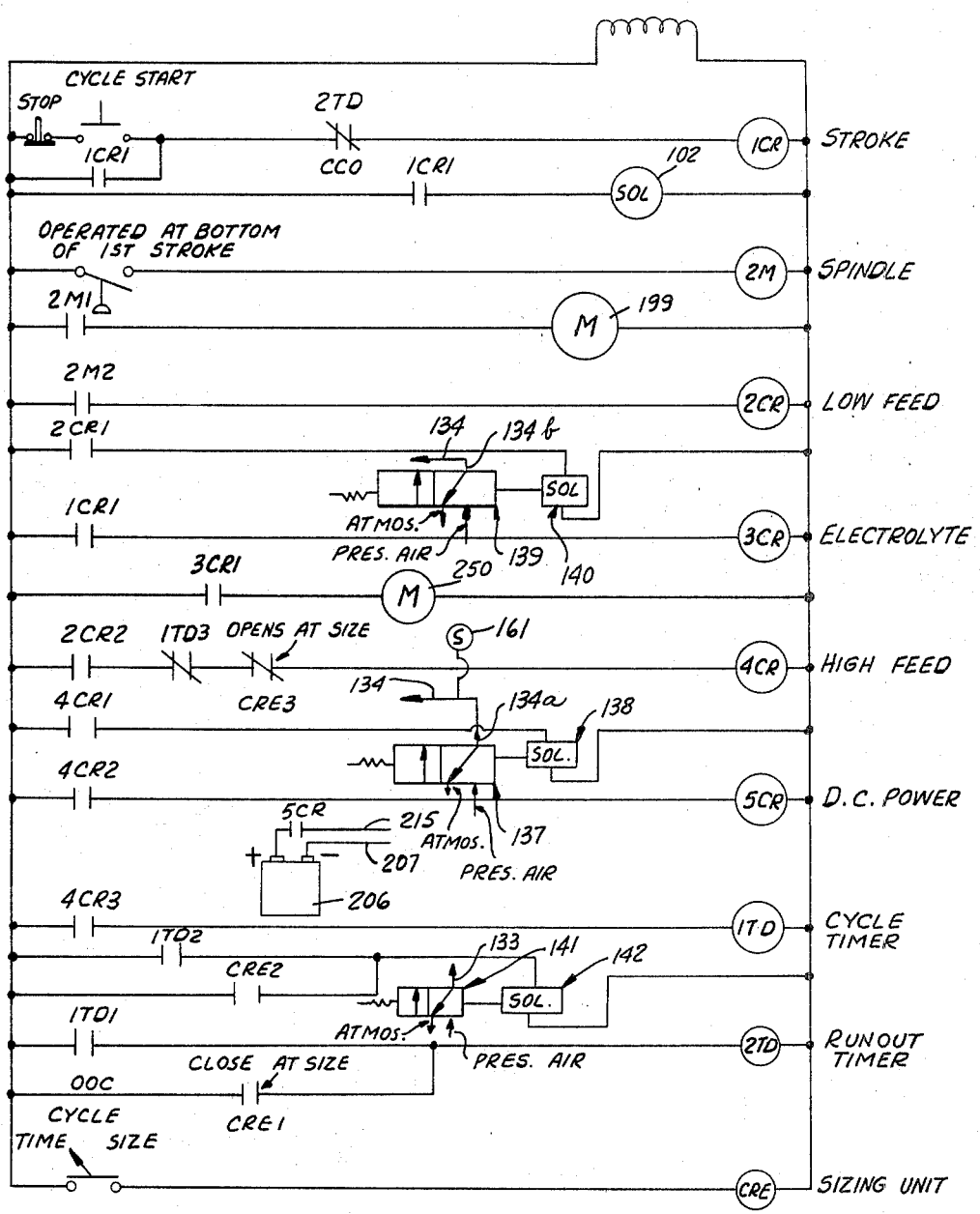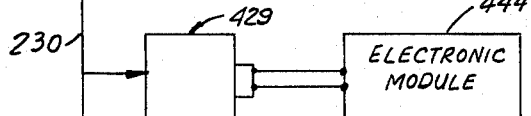

United States Patent Office 3,390,068
Patented June 25, 1968

3,390,068
ELECTROCHEMICAL HONING APPARATUS
INCLUDING BORE GAUGING MEANS
Myron P. Ellis, Royal Oak, Robert C. Engle, Livonia, Albin S. Czubak, Detroit, and Everett A. Randlett, Jr., Southfield, Mich., assignors to Micromatic Hone Corporation, Detroit, Mich.
Continuation of application Ser. No. 498,335, Oct. 20, 1965. This application Apr. 7, 1967, Ser. No. 629,330
28 Claims. (Cl. 204—212)

ABSTRACT OF THE DISCLOSURE

Electrochemical honing apparatus for removing metal from a workpiece bore surface by combined electrochemical machining and mechanical honing processes, including a pressure sensing gauge arm means connected to the rotatable and reciprocable cathode tool, and adapted to be moved radially outwardly to engage the bore wall surface of a workpiece and sense the change in the size of the bore during the metal removing operation.

---

This application is a continuation of application Ser. No. 498,335, filed Oct. 20, 1965, now abandoned.

This invention relates generally to the honing art, and more particularly to an electrochemical honing apparatus and method for removing metal from a workpiece surface by a combined electrochemical machining and mechanical honing process.

The art of removing metal from a work surface by electrochemical machining is well known. Heretofore, unsuccessful attempts have been made to apply the principles of electrochemical machining to a honing operation. Such attempts employed conductive abrasives in the honing tool for conducting D.C. current through the abrasives and into the workpiece. These attempts were not successful due to the problem of maintaining electrolyte between the abrasives and the workpiece. A further problem was presented by the small metallic chips and debris which became trapped between the abrasives and the workpiece causing short circuiting and arcing. In view of the foregoing, it is an important object of the present invention to provide an electrochemical honing apparatus and method to overcome the aforementioned problems of the prior art attempts to provide an electrolytic assist to a honing operation.

It is another object of the present invention to provide a novel electrochemical honing apparatus having a honing tool constructed and arranged so that there is a predetermined or controlled gap, as for example, a few thousandths of an inch, between the tool and the surface of a workpiece to be honed, the tool being provided with nonconductive abrasive elements adapted to be expanded into abrading engagement with the workpiece surface, means for rendering the tool cathodic and the workpiece anodic, and means for introducing electrolyte into said gap while the tool is rotated and reciprocated relative to the work surface to remove material from the workpiece surface both electrolytically and mechanically.

It is a further object of the present invention to provide a novel electrochemical honing apparatus having improved means for controlling both the electrolyte distribution between the cathode tool and the anode surface of the workpiece being operated on, and having means for controlling the flow path of the electric current between the workpiece and the tool.

It is another object of the present invention to provide a novel electrochemical honing apparatus wherein the honing tool may be mounted in a rigid manner or in a floating manner, and wherein the workpiece may be positioned to float in the tool fixture or be held rigid.

It is still another object of the present invention to provide a novel electrochemical honing apparatus consrtucted so that the honing stones may be advanced continuously during a honing operation to compensate for the wear on the stones without altering the spacing between the cathode tool member and the anode work surface.

It is still another object of the present invention to provide a novel electrochemical honing apparatus which is adapted to remove material from a workpiece surface in a shorter time than heretofore possible with the prior art honing machines and to deburr the workpiece simultaneously.

It is still another object of the present invention to provide a novel electrochemical honing apparatus which is adapted to remove stock from a workpiece surface in a speedy and accurate manner, without heating the workpiece, and with a minimum of mechanical energy input to the workpiece so that the workpiece surface is essentially free of stresses.

It is still another object of the present invention to provide a novel electrochemical honing apparatus adapted to remove material from very hard metals in a fast and economical manner.

It is still a further object of the present invention to provide a novel mechanical-air-electronic automatic sizing means for controlling the operation of a honing apparatus.

It is a further object of the present invention to provide a novel and improved electrochemical honing apparatus which is provided with a vented workpiece enclosure adapted to contain the electrolyte in a localized area and which is disposed in a passageway in a novel machine structure adapted for production line facilities.

It is still another object of the present invention to provide a novel and improved electrochemical honing apparatus which comprises a cathode tool means, an anode workpiece holding means disposed in operative relationship to said cathode tool means and adapted to hold an anode workpiece so as to maintain a controlled gap between the cathode tool means and an anode work surface to be machined, means for flowing an electrolyte between the cathode tool means and the anode work surface, means for passing a direct electric current from the anode work surface to the cathode tool means through the electrolyte, a plurality of movably mounted abrasive means on said cathode tool means engageable with said anode work surface, means for rotating and reciprocating the cathode tool means relative to the anode work surface, means for advancing the abrasive means into abrading engagement with the anode work surface, means for controlling the gap between the cathode tool means and the anode work surface, and means for automatically sizing the workpiece for controlling the operation of the apparatus.

It is another object of the present invention to provide an improved electrochemical honing method which produces a conventional honed surface cross-hatch pattern or finish by turning off the electrolytic action over the last portion of the honing operation and allowing the honing stones to complete the machining, and which provides more efficient honing stone life.

Other objects, features and advantages of this invention will be apparent from the following detailed description, appended claims, and the accompanying drawings.

In the drawings:

FIG. 5 is a plan view of the structure illustrated in FIG. 4, taken along the line 5—5 thereof, and looking in the direction of the arrows;

FIG. 6 is a fragmentary, right side elevational view of the structure illustrated in FIG. 5, taken along the line 6—6 thereof, and looking in the direction of the arrows;

FIG. 7 is a fragmentary, horizontal section view of the structure illustrated in FIG. 2, taken along the line 7—7 thereof, and looking in the direction of the arrows;

FIG. 8 is a fragmentary, rear elevational view of the structure illustrated in FIG. 7, taken along the line 8—8 thereof, and looking in the direction of the arrows;

FIG. 9 is a fragmentary, section view of the structure illustrated in FIG. 7, taken along the line 9—9 thereof, and looking in the direction of the arrows;

FIG. 10 is a fragmentary, elevational section view of the structure illustrated in FIG. 9, taken along the line 10—10 thereof, and looking in the direction of the arrows;

FIG. 11 is a front elevational view of the workpiece fixture enclosure employed in the apparatus illustrated in FIG. 1;

FIG. 12 is an enlarged, fragmentary, elevational view of the structure illustrated in FIG. 11, taken along the line 12—12 thereof, and looking in the direction of the arrows;

FIG. 13 is a left side elevational view of the structure illustrated in FIG. 11, taken along the line 13—13 thereof, and looking in the direction of the arrows;

FIG. 14 is an enlarged, fragmentary, horizontal section view of the structure illustrated in FIG. 13, taken along the line 14—14 thereof, and looking in the direction of the arrows;

FIG. 15 is a fragmentary, enlarged, elevational section view of the structure illustrated in FIG. 8, taken along the line 15—15 thereof, and looking in the direction of the arrows;

FIG. 16 is a fragmentary, horizontal section view of the structure illustrated in FIG. 15, taken along the line 16—16 thereof, and looking in the direction of the arrows;

FIG. 17 is a perspective view of an electrochemical honing tool made in accordance with the principles of the present invention;

FIG. 18 is an elevational section view of the honing tool illustrated in FIG. 17, taken substantially along the line 18—18 thereof, looking in the direction of the arrows, and showing the tool attached to the lower end of the honing apparatus spindle;

FIG. 19 is an elevational section view of the tool structure illustrated in FIG. 17, taken substantially along the line 19—19 thereof, and looking in the direction of the arrows;

FIG. 20 is an enlarged, horizontal section view of the structure illustrated in FIG. 19, taken along the line 20—20 thereof, and looking in the direction of the arrows;

FIG. 21 is an enlarged, horizontal section view of the structure illustrated in FIG. 18, taken along the line 21—21 thereof, and looking in the direction of the arrows;

FIG. 22 is a fragmentary, elevational section view of a modified electrolyte discharge hole arrangement in an electrochemical honing tool;

FIG. 23 is a fragmentary perspective view of a workpiece being operated on by an electrochemical honing tool to illustrated the principles of the present invention;

FIGS. 24, 25 and 26 illustrate three different embodiments of air-electronic bore sizing means adapted to be employed in an electrochemical honing apparatus made in accordance with the principles of the present invention;

FIG. 27 is a fragmentary, side elevational view of the tool illustrated in FIG. 26, taken along the line 27—27 thereof, and looking in the direction of the arrows;

FIG. 28 is a bottom plan view of the structure illustrated in FIG. 27, taken along the line 28—28 thereof, and looking in the direction of the arrows;

FIGS. 29 and 30 are fragmentary, sectional views of two additional embodiments of air-electronic bore sizing means adapted to be employed in an electrochemical honing apparatus made in accordance with the principles of the present invention;

FIG. 31 is a continuation of the air-electronic sizing structure shown in FIG. 30, and showing the bottom end thereof;

FIG. 32 is a fragmentary, side elevational view, partly in section, of a modified air nozzle construction for use with an air-electronic bore sizing means of the type illustrated in FIGS. 29 and 30;

FIG. 33 is a fragmentary, elevational section view of the structure illustrated in FIG. 32, taken along the line 33—33 thereof, and looking in the direction of the arrows;

FIG. 34 is a top plan view of an illustrative workpiece fixture adapted to be used with the electrochemical honing apparatus illustrated in FIG. 1;

FIG. 35 is a fragmentary, elevational section view of the structure illustrated in FIG. 34, taken along the line 35—35 thereof, and looking in the direction of the arrows;

FIG. 36 is a fragmentary, longitudinal section view of the structure illustrated in FIG. 34, taken along the line 36—36 thereof, and looking in the direction of the arrows;

FIG. 37 is a fragmentary, front elevational view of the structure illustrated in FIG. 34, taken along the lines 37—37 thereof, and looking in the direction of the arrows;

FIG. 38 is an elevational, section view of a modified workpiece fixture and electrolyte supply system;

FIG. 39 is a fragmentary bottom view of the workpiece fixture shown in FIG. 35, and showing a modified structure for rotating the workpiece during an electrochemical honing operation;

FIG. 40 is a fragmentary, elevational, section view of the structure illustrated in FIG. 39, taken along the line 40—40 thereof, and looking in the direction of the arrows;

FIG. 41 is an elevational, section view of a modified tool spindle;

FIG. 42 is a perspective view of a modified tool adapted to be used with the spindle illustrated in FIG. 41;

FIG. 43 is an enlarged, broken, fragmentary, elevational section view of the tool illustrated in FIG. 42, taken along the line 43—43 thereof, and looking in the direction of the arrows;

FIG. 44 is a fragmentary, side elevational view of the structure illustrated in FIG. 43, taken along the line 44—44 thereof, and looking in the direction of the arrows;

FIG. 45 is a horizontal section view of the structure illustrated in FIG. 43, taken along the line 45—45 thereof, and looking in the direction of the arrows;

FIG. 46 is an elevational section view of a ball adaptor connection structure for providing a floating tool connection to the spindle;

FIG. 47 is a bottom plan view of the structure illustrated in FIG. 46, taken along the line 47—47 thereof, and looking in the direction of the arrows;

FIG. 48 is an elevational section view of a ball adaptor for mounting a workpiece in a floating position;

FIG. 49 is a top plan view of a transducer which may be employed in the indicating circuit of an air-electronic bore gaging means;

FIG. 50 is an enlarged, elevational section view of the transducer illustrated in FIG. 49, taken along the line 50–50 thereof, and looking in the direction of the arrows;

FIG. 51 is a schematic view of a hydraulic circuit for operating the spindle head assembly;

FIG. 52 is a schematic view of the pneumatic and electrical control mechanism used in conjunction with the bore gaging means;

FIG. 53 is a schematic view of an electrical control circuit for the honing apparatus;

FIG. 54 is a schematic view of an electrolyte supply circuit for the honing apparatus;

FIG. 55 is a fragmentary, elevational section view of a modified electrochemical honing tool provided with means for distributing electrolyte through a porous abrasive member; and, FIG. 56 is a fragmentary, elevational section view of a modified workpiece supporting means provided with means for distributing electrolyte through a workpiece.

Figure 1:
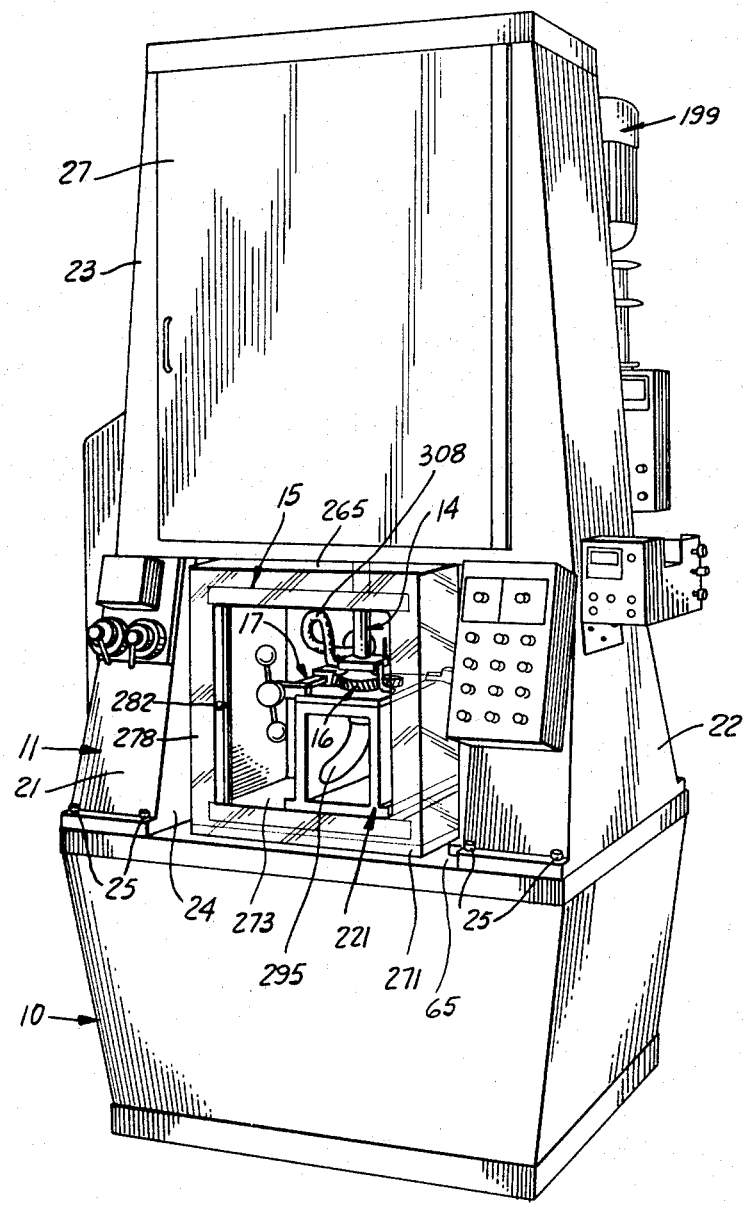
FIG. 1 is a front perspective view of an electrochemical honing apparatus made in accordance with the principles of the present invention.
Figure 3:
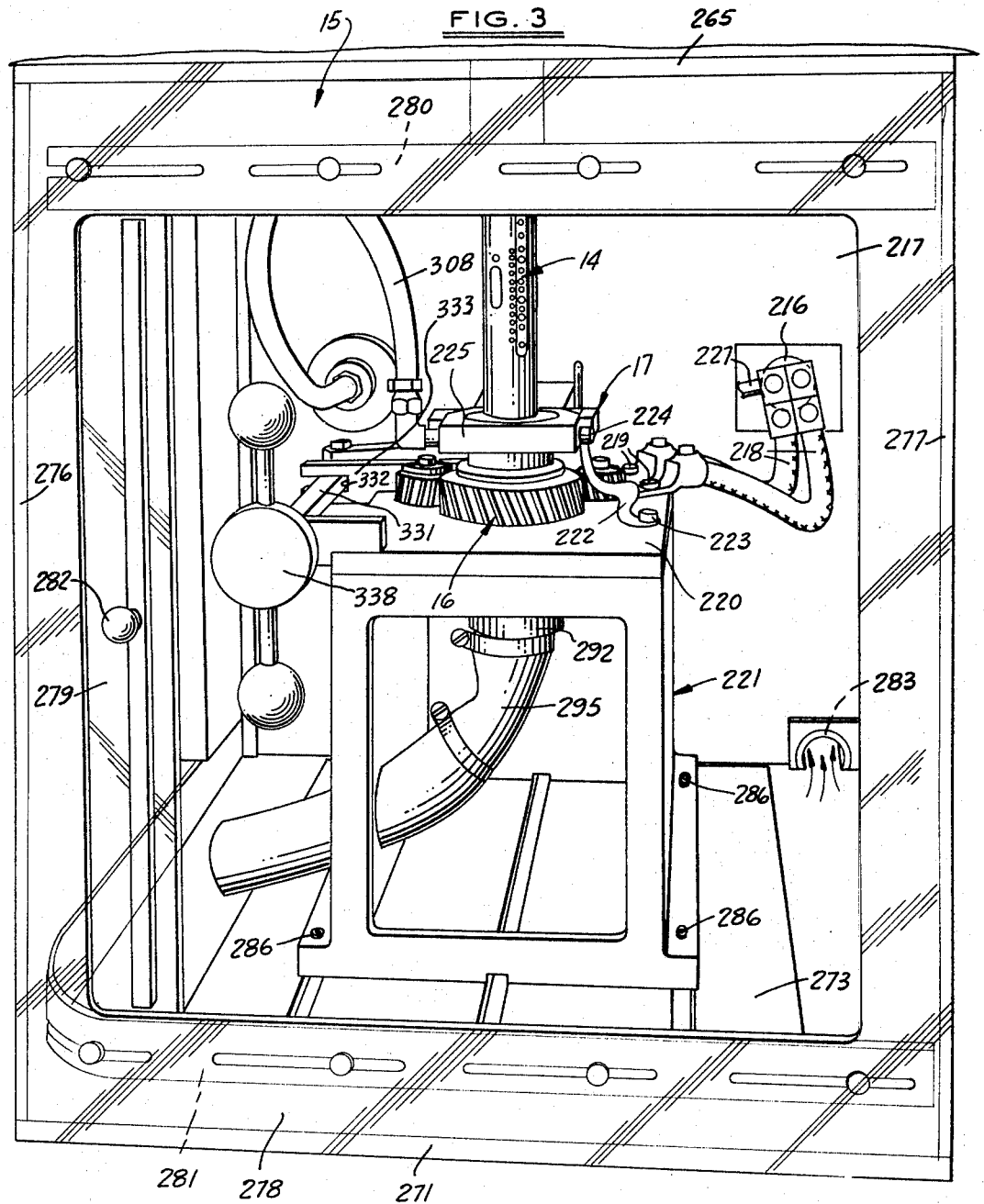
FIG. 3 is an enlarged, front perspective view of the enclosed workpiece fixture employed in the apparatus illustrated in FIG. 1.

Referring now to the drawings, and in particular to FIGS. 1 and 3, it will be seen that the invention is illustrated in an electrochemical honing apparatus for honing a cylindrical bore in a gear. It will be understood that the invention may also be embodied in machines for honing other types of workpiece surfaces, as for example, flat surfaces, external diameter surfaces, spherical component surfaces, bearing raceway surfaces, and irregular surfaces as cam surfaces.

GENERAL DESCRIPTION

Figure 2:
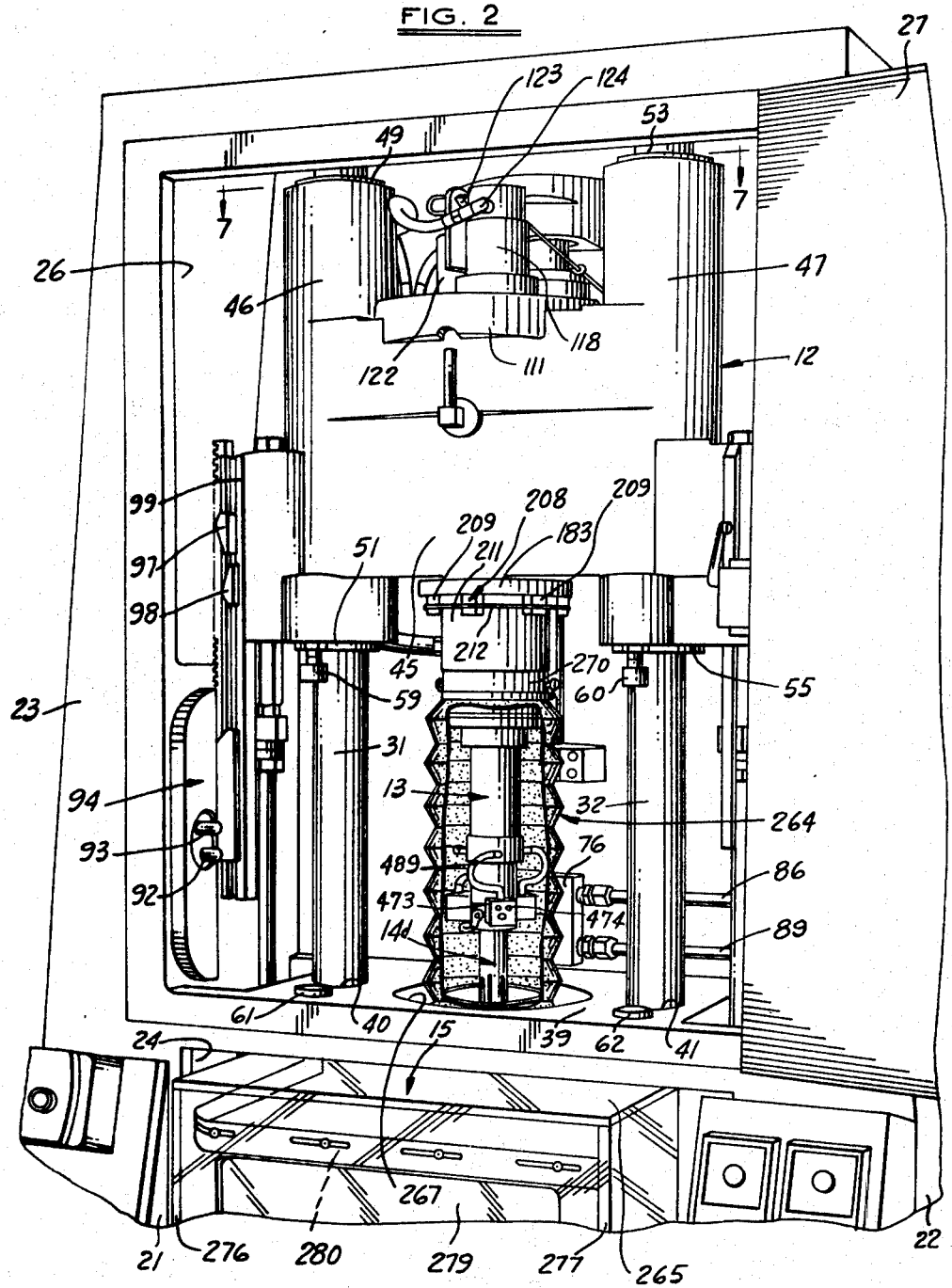
FIG. 2 is an enlarged, fragmentary, perspective view of the upper portion of the electrochemical honing apparatus shown in FIG. 1, with the front cover swung to the open position to show the inner structure of the apparatus.

FIG. 1 shows a perspective view of an illustrative embodiment which comprises a hollow base, generally indicated by the numeral 10, on which is mounted a column generally indicated by the numeral 11. As shown in FIG. 2, the numeral 12 generally indicates a spindle head or ram assembly on which is operatively mounted a tool spindle generally indicated by the numeral 13. A tool member, generally indicated by the numeral 14, is connected to the spindle 13. The tool member 14 extends downwardly into operative engagement with a workpiece 16 held in the workpiece fixture 17 that is disposed in a transparent fixture enclosure 15. The workpiece 16 is illustrated as comprising a gear. The honing apparatus includes means for reciprocating and rotating the tool member 14 relative to the workpiece 16 as described in detail hereinafter. The tool member 14 carries means for maintaining it in a spaced apart position relative to the surface of the workpiece 16 which is being machined. The tool member 14 is provided with sizing means for controlling the operation of the honing apparatus. As described hereinafter, electrolyte is supplied to the gap or space between the tool 14 and the workpiece surface during the machine operating and direct current is simultaneously passed from the workpiece 16 to the tool member 14, as described hereinafter.

MACHINE HOUSING

As shown in FIG. 1, the machine column 11 includes the lower spaced apart hollow legs or supports 21 and 22 which form compartments for housing a part of the operating structure of the machine. The numeral 23 indicates the upper end of the column 11 which is integral with the legs 21 and 22 and which encloses the upper end of the area between legs 21 and 22 to form a passageway 24 in which is seated the fixture enclosure 15. The upper end of the base 10 encloses the lower end of the passageway 24. It will be seen that this structure permits the machine to be set up for production line operation whereby workpieces may be moved into and out of the workpiece fixture by suitable work transfer means. As shown in FIG. 1, the legs 21 and 22 are secured to the base 10 by any suitable means, as by the screws 25. As shown in FIG. 2, the upper end 23 of the column 11 is provided with a compartment 26 in which is mounted the spindle head assembly 12. The compartment 26 is enclosed on the front side thereof by the hingedly mounted door 27.

SPINDLE HEAD ASSEMBLY

Figure 4:
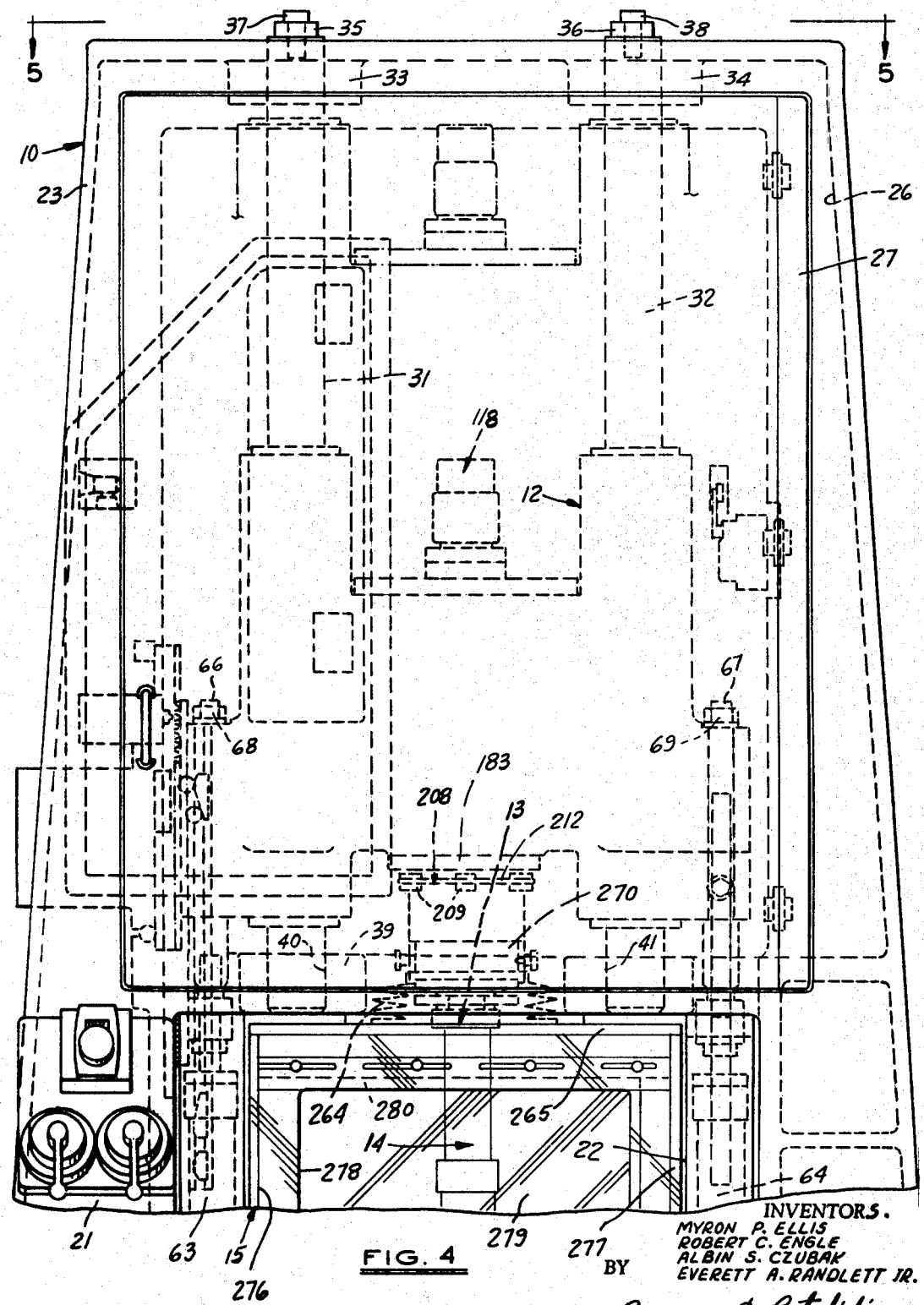
FIG. 4 is an enlarged, fragmentary, front elevational view of the upper end of the apparatus illustrated in FIG. 1.

As shown in FIGS. 2 and 9, the spindle head assembly 12 is slidably mounted for vertical reciprocating movement on a pair of vertical, spaced apart guide bars 31 and 32. As shown in FIG. 4, the upper ends of the guide bars 31 and 32 are fixed in suitable bores formed in the spaced apart bosses 33 and 34 formed on the upper end wall of the column 11. The guide bars 31 and 32 are retained in place in the bosses 33 and 34 by means of the retainer plates 35 and 36 which overlie the upper ends of the guide bars and which are fixed to the top wall of the column upper portion 23 by the screws 37 and 38, respectively. As best seen in FIG. 4, the lower ends of the guide bars 31 and 32 are seated in the bores 40 and 41, respectively, which are formed in the lower end wall 39 of the column upper portion 23.

The spindle head assembly 12 includes the central housing 45, on each side of which is integrally formed the vertically disposed guide sleeves 46 and 47. As shown in FIG. 9, the guide bar 31 is slidably mounted in the guide sleeve 46 by means of the sleeve bearings 48 and 50 which are secured in place by suitable retainer members 49 and 51, respectively. The guide bar 32 is slidably mounted in the guide sleeve 47 by the spaced apart sleeve bearings 52 and 54 which are retained in place by the retainer members 53 and 55, respectively.

As shown in FIG. 2, the spindle head assembly 12 is provided with a pair of adjustably mounted stop members 59 and 60 on the lower end thereof, which are adapted to abut the stop pads 61 and 62, respectively, that are mounted on the lower end wall 39 of the compartment 26.

As best seen in FIG. 4, the spindle head assembly 12 is adapted to be reciprocated upwardly and downwardly by a pair of hydraulic cylinders 63 and 64 which are disposed in the hollow column legs 21 and 22, respectively. As shown in FIG. 6, the lower end of the hydraulic cylinder 64 is fixed to the upper end wall 65 of the base 10. The other hydraulic cylinder 63 is similarly fixed to the base wall 65. As shown in FIG. 4, the upper ends of the cylinder rods of the hydraulic cylinders 63 and 64 are secured to the sides of the spindle head assembly 12 by means of the threaded rods 66 and 67, and the nuts 68 and 69, respectively.

It will be understood that the hydraulic cylinders 63 and 64 may be operated and controlled by any suitable hydraulic control circuit means. A suitable hydraulic control circuit means adapted to operate the hydraulic cylinders 63 and 64 is a control panel identified by Model No. C–1286–D. An illustrative control circuit which may be employed to operate the hydraulic cylinders 63 and 64 is shown in FIG. 51. The illustrative hydraulic control circuit includes a hydraulic fluid reservoir 70, a pump 71 driven by an electric motor 72 and adapted to draw fluid from the reservoir through a pipe 73 and supply hydraulic fluid under pressure to a pilot valve 75 and a reversing valve 76.

The pump 71 supplies the pressurized fluid to the valves 75 and 76 through the pipes 74, 77 and 78. The valves 75 and 76 are connected to the reservoir 70 by the return lines or pipes 79, 80 and 81. The reversing valve 76 is a four-way, hydraulically operated valve which is connected to one end of each of the cylinders 63 and 64 by means of the pipes 84, 85 and 86. The reversing valve 76 is connected to the other end of each of the hydraulic cylinders 63 and 64 by the pipes 87, 88 and 89. The reversing valve 76 is connected to the pilot valve 75 by the pipes 90 and 91 for supplying hydraulic fluid under pressure for shifting the reversing valve 76 as directed by the pilot valve 75. The pilot valve 76 is adapted to be mechanically actuated by the actuators 92 and 93 which are mounted in hydraulic control panel 94, as shown in FIG. 2. The control panel 94 is disposed along one side of the spindle head assembly 12. The mechanical actuators 92 and 93 are adapted to be operated by the dogs 97 and 98 which are adjustably mounted on the slide bar 99 carried on the left side of the spindle head assembly 12, as viewed in FIG. 2. It will be seen that as the spindle head assembly 12 reciprocates upwardly and downwardly that the dogs 97 and 98 will operate the actuators 92 and 93 to reverse the pilot valve 75 which in turn operates the reversing valve 76 to operate the hydraulic cylinders 63 and 64.

In normal operation, the length of stroke of the spindle head assembly 12 is determined by the locations of the adjustable trip dogs 97 and 98. The rate of travel of the spindle head assembly 12 is adapted to be set by the adjustment of a volume-control lever on the aforementioned hydraulic control panel. Said hydraulic control panel also includes means for manually controlling the strokes of the spindle head assembly 12 for set-up purposes. Reference numeral 100 in FIG. 6 generally indicates the dotted line position which the spindle head assembly 12 assumes at the upper end of its stroke. As shown in FIG. 51, a suitable flow control valve 101 is employed to by-pass the flow of pressurized fluid into the pipe 77 when it is desired to stop the reciprocation of the spindle head assembly 12. The valve 101 is adapted to be shifted to a position to initiate reciprocation of the spindle head assembly 12 when the solenoid 102 is energized, as described hereinafter. FIG. 2 shows the spindle head assembly 12 in the raised inoperative position.

SPINDLE

As shown in FIGS. 9 and 10, the spindle 13 is vertically disposed between the guide bars 31 and 32 and in alignment therewith. The spindle 13 includes the spindle shaft 103 which is rotatably mounted in the vertical bore 104 formed through the housing 45. The upper end of the spindle shaft 103 is rotatably mounted in suitable bearings 105 which are operatively mounted in the upper end of the bore 104 and retained in place by a suitable bearing retainer 106. The spindle shaft 103 is provided with the threaded portion 107 on which is threadably mounted the flange sleeve 108 that is adapted to engage the lower end of the hub of a drive gear 109. The gear 109 is secured to the spindle shaft 103 by any suitable means, as by a suitable key. The gear 109 is disposed in the gear chamber 110 which communicates with the upper end of the bore 104. The gear chamber 110 is enclosed by a suitable cover 111 which is secured to the housing 45 by any suitable means. The upper threaded end 114 of the spindle shaft 103 extends upwardly through a hole 112 that is formed through the cover 111. A stepped retainer sleeve 113 is mounted on the shaft threaded portion 114 and retains the gear 109 in position on the spindle shaft 103 in conjunction with a pair of suitable lock nuts 115. The spindle shaft 103 may be made from any suitable material, and preferably from stainless steel. As shown in FIGS. 8 and 9, a suitable rotary fluid coupling is operatively mounted on the upper end of the spindle shaft 103 and is generally indicated by the numeral 118. A suitable rotary coupling of this type available on the market is one known as a "Deublin" coupling, Model 1500. The coupling 118 is adapted to admit fluid under pressure into the passages 119 and 120 which are formed in the upper end of the spindle shaft 103, as shown in FIG. 15, to operate the honing stone feed piston generally indicated by the numeral 121. It will be understood that the fluid used to operate the feed piston 121 may be either a pneumatic fluid or a hydraulic fluid. The outer portion of the coupling 118 is fixed to the bracket 122 carried on the cover 111. The coupling 118 conducts fluid from one end of each of the flexible hoses 123 and 124 into the passages 119 and 120, respectively.

As shown in FIG. 5, the other end of the flexible hose 123 is connected to a suitable fitting which is carried on a support arm or bracket 128 that is fixed to the rear side of the spindle head assembly housing 45 by any suitable means, as by the screws 129. The other end of the flexible hose 124 is connected to a suitable fitting which is fixed to the bracket 128.

As shown in FIG. 5, a second fitting support bracket 132 is secured to the top of the column portion 23. The pressurized air hoses 123 and 124 are connected by passages in the bracket 128 to a second set of flexible hoses 130 and 131, respectively. The hoses 130 and 131 are connected by suitable passages in the bracket 132, which are in turn connected with a pair of pressurized air supply tubes 133 and 134, respectively.

It will be understood that the tube 134, the hose 131, and the hose 124 conduct air under pressure into the passage 119 for moving the feed piston 121 downwardly to expand the honing stones carried in the tool 14, as more fully hereinafter explained. The pneumatic pressure tube 134 is adapted to be connected selectively to sources of high and low pressure air for high feed and low feed purposes. As shown in the control diagram of FIG. 53, a supply of high pressure air from a suitable source is connected to the tube 134 through the tube 134a which is connected to said source through the solenoid operated flow control valve 137. The valve 137 is adapted to be operated by a solenoid 138. Low pressure air may also be fed selectively to the input tube 134 through the tube 134b and the flow control valve 139 which is operated by the solenoid 140. As shown in FIG. 53, the tube 133 is connected to a suitable source of pressurized air for supplying air to the passage 120 for collapsing the feed piston 121, as explained more fully hereinafter. The flow of pressurized air into the tube 133 is controlled by the flow control valve 144 which is operated by the solenoid 142.

As shown in FIG. 15, the feed piston 121 comprises an elongated rod 144 which is reciprocably mounted in the enlarged central bore 143 formed in the spindle shaft 103. A piston 145 is formed on the upper end of the rod 144, and the lower end of the bore 143 is enclosed by the cylinder head 146 which is fixed in place by any suitable means and provided with a packing means 147. The lower end of the rod 144 is provided with a C-shaped or bayonet type connection means for operative connection to a cone rod in the tool 14, as described hereinafter.

The passage 119 communicates with an enlarged cylinder bore 149 formed in the upper end of the rod 144. Fluid under pressure is adapted to enter the bore 149 and force the rod 144 downwardly to expand the honing stones, as described hereafter. The passage 120 conducts fluid under pressure through the port 150 into the cylinder bore 143 for forcing the piston 145 and the rod 144 upwardly to contract the honing stones.

The feed piston 121 is provided with a signalling means to indicate that the honing stones have worn to the point where they must be replaced. As shown in FIG. 15, the piston 145 is provided with a threaded bore 154 which is enclosed at the upper end by the threaded plug 155 that is provided with a passage therethrough indicated by the numeral 156. The lower end of the bore 154 is enclosed by the threaded plug 158 through which is formed the passage 159. A compression spring 157 is disposed in the bore 154 between the plugs 155 and 158, and normally biases a rod valve or poppet valve 160 downwardly into seating engagement with a valve seat formed on the inner end of the passage 159. As shown in FIG. 15, the lower end of the rod valve 160 extends below the piston 145. As the honing stones wear, the feed piston 121 feeds downwardly until the lower end of the rod valve or poppet valve 160 bottoms on the cylinder head 146. The poppet valve 160 will open and pressure from the upper end of the bore 143 will escape into the lower end of the bore 143 on the lower side of piston 145, and the pressure in the passage 119 will decrease. The decreasing pressure is indicated on a suitable pressure switch connected in a suitable place in the pressure fluid line feeding the passage 119, as indicated by the pressure switch 161 in the control circuit of FIG. 53. It will be understood that any suitable pressure switch and signalling means may be used. A suitable pressure switch and signalling means is shown in the United States patent to John H. Greening, No. 3,059,381.

As shown in FIG. 15, the contraction cylinder is provided with a similar poppet valve arrangement to release the pressure in the cylinder formed by the bore 143 between the piston 145 and the cylinder head 146. A second bore 164 is formed through the piston 145 and is enclosed at the ends thereof by the threaded plugs 165 and 166 which are each provided with a suitable axial passage therethrough. A compression spring 168 is mounted in the bore 164 between the plugs 165 and 166, and normally biases a poppet valve 167 into seating engagement on a valve seat formed on the inner end of the passage formed through the plug 165. The poppet valve 167 has a rod extension which extends outwardly beyond the plug 165 and engages the upper end wall 169 of the bore 143 when the feed piston 121 reaches its uppermost position, and the poppet valve 167 opens and decreases the pressure in the cylinder formed by the bore 143.

The piston rod 144 is normally biased to the position shown in FIG. 15 by a spring 170 which is disposed in a longitudinally extended slot or recess 171 formed in a cylindrical plug 172 mounted in the lower end of the bore 143. The lower end of the piston rod 144 is slidably mounted in a central bore 173 formed in the plug 172. The upper end of the spring 170 is secured to a transverse anchor pin 174 which is mounted in the transverse bore 175 formed in the upper end of the piston rod 144. The outer end of the pin 174 extends in to the longitudinal slot 176 formed in the upper end of the plug 172 and prevents rotation of the piston rod 144. The lower end of the spring 170 is secured to an anchor member 177 which is secured to the plug 172 by any suitable means, as by the set screw 178.

As shown in FIGS. 9 and 15, the lower end of the spindle shaft 103 is rotatably mounted in a suitable precision bearing 182. As shown in FIG. 15, the bearing 182 is retained in place by a bearing retainer 183 which is suitably secured to the spindle head assembly 12 by any suitable means, as by suitable screws. The retainer 183 is provided with a passage 184 for lubricating the bearing 182.

The spindle shaft 103 is rotated by the following described structure. As shown in FIG. 10, the spindle shaft drive gear 109 is driven by a gear 185 which is operatively connected to a conventional ball spline 186. A spline shaft 187 is operatively mounted through the ball spline 186 and rotates the ball spline 186 and permits it to move upwardly and downwardly on the spline shaft 187 as the spindle head assembly 12 is reciprocated upwardly and downwardly. As shown in FIG. 10, the ball spline 186 is operatively mounted in the housing 188 which is integrally formed with the spindle head assembly 12 and moves upwardly and downwardly therewith. The ball spline 186 is rotatably mounted in suitable bearings as 189 and 190. As shown in FIG. 6, the upper and lower ends of the spline shaft 187 are rotatably journalled in suitable bearing mounts 191 and 192 carried by the column portion 23.

As shown in FIGS. 5 and 6, a suitable pulley 195 is fixed to the upper end of the spline shaft 187 by any suitable means, as by a key. The pulley 195 is driven by a belt 196 which is driven by a pulley 197 fixed to the upper end of the output shaft 198 of a suitable combination gear reduction and electric motor drive unit, generally indicated by the numeral 199. The drive unit 199 is supported on the rear side of the column portion 23 by any suitable means, as by the support bracket 200. The motorized drive unit or assembly 199 may include any suitable drive motor as, for example, a 7½ horsepower motor operating at 1800 r.p.m. As shown in FIG. 5, the slack in the belt 196 is taken up by the wheel 201 which is rotatably mounted on one end of an arm 202 that has the other end adjustably mounted on the shaft 203 carried on the upper end of the column portion 23.

The spindle 13 is provided with the following described structure for connecting it to the negative terminal of a suitable D.C. power supply. As shown in the control circuit of FIG. 53, a suitable direct current power supply 206 is provided with a negative terminal to which is connected one end of a suitable cable 207. As shown in FIG. 5, the other end of the cable 207 is operatively connected to a suitable lug on the bracket 132 on top of the column portion 23 that is connected to an insulated electrical cable supported by the bracket 132 and provided with a second lug to which is connected one end of a flexible cable 213. The other end of the cable 213 is electrically connected to the bracket 128 fixed to the spindle head assembly 12 to connect the spindle head assembly 12 to the negative terminal of the power supply 206.

As shown in FIGS. 2 and 15, a suitable brush rig assembly, generally designated by the numeral 208, is provided for electrically connecting the spindle head assembly 12 to the rotatable spindle shaft 103. The spindle shaft 103 acts as an armature and the brush rig assembly 208 is provided with approximately six brushes 209 which are adapted to be in electrical sliding engagement with the outer surface 210 of the spindle shaft 103, as shown in FIG. 15. The spindle shaft assembly 12 is provided with an annular retainer sleeve or housing 211 in which is formed a plurality of inwardly extended, radially disposed, circumferentially spaced apart slots 204 in which are slidably mounted the brushes 209. As shown in FIG. 5, the cable 213 is connected to a cable 214 which is secured to the housing 211. The housing 211 is connected to and carried by the bearing retainer 183.

As illustrated in FIG. 15, each of the brushes 209 is electrically connected to the spindle head assembly 12 by a cable 205 which has one end fixed to the outer end of a brush and the other end provided with a lug that is connected by a suitable screw to the lower side of the flange on the bearing retainer 183. As shown in FIGS. 2 and 15, the brushes 209 are biased inwardly by an annular garter spring 212.

The D.C. current circuit is completed from the positive terminal of the power supply 206 to the tool 14 by the following means. As shown in FIG. 53, the positive terminal of the power supply 206 is connected by a cable 215 to an insulated fitting 216 (FIG. 13) which is mounted in the rear wall 217 of the fixture enclosure 15. As shown in FIG. 3, the fitting 216 is connected on the inside of the enclosure 15 to a pair of cables 218 which are connected by the screws 219 to the fixture plate 220 of the electrically conductive metal pedestal 221. The pedestal 221 is preferably made from stainless steel. It will be seen that the machine is negative and the workpiece fixture is positive. The D.C. current is passed to the lower face of the workpiece 16 from the surface of the plate 220 on the pedestal 221. The current is passed to the upper face of the workpiece 16 through the cable 222 which has one end fixed by the screw 223 to the plate 220 and the other end connected by the screw 224 to the plate 225 of the fixture 17. As illustrated in FIG. 34, the work fixture is provided with a pair of brushes 226 and 226a which are electrically connected by the cables 227 to the electrical fitting 216 shown in FIG. 3 for passing current to the side of the workpiece as more fully described hereinafter.

As shown in FIG. 5, a tube 230 which is connected to a suitable source of air under pressure is connected to a fitting on the bracket 132 for supplying air under pressure for the bore sizing apparatus carried by the tool 14. A flexible hose 231 carries the pressurized air to a suitable fitting mounted on the bracket 128 from which extends a second flexible hose 232. As shown in FIG. 8, the hose 232 is connected to a suitable fitting mounted on the housing sleeve 211. FIG. 15 shows the hose 232 operatively connected to supply air under pressure into the passage 233 formed in the housing sleeve 211. The passage 233 extends downwardly longitudinally on the spindle shaft 103 and is enclosed at the lower end thereof by the plug 234. The passage 233 communicates with the transverse passage 235 formed in the inner sleeve 237 which is carried on the inside of the sleeve 211. The passage 235 communicates with the longitudinally extended passage 238 formed in the spindle shaft 103. The passage 238 communicates at the lower end thereof with the transverse passage 239 which in turn communicates the longitudinal passage 240 in the spindle shaft 103 to the passage 241 formed in the tool 14 for use in a bore sizing apparatus, as described in detail hereinafter.

As best seen in FIG. 15, the spindle 13 is provided on the lower end thereof with an adaptor 242 which is fixed to a flange on the spindle shaft 103 by a plurality of screws 243. The adaptor 242 is provided on the lower end thereof with the threaded rigid extension or coupling portion 244. A collar or coupling ring 245 on the tool 14 is adapted to be threadably mounted on the spindle threaded portion 244 for securing the tool 14 to the spindle shaft 103.

The spindle shaft 103 is provided with a supply of electrolyte by the following described structure. As shown in FIG. 54, the honing apparatus is provided with a suitable electrolyte reservoir 250. A suitable pump 251 is driven by an electric motor 252 which is mounted on the reservoir and pumps electrolyte to one end of the hose 253 that has its other end connected to a suitable fitting on the bracket 132 mounted on the column portion 23, as shown in FIG. 5. The electrolyte is conveyed from the fitting on the bracket 132 by a flexible hose 254 to a second suitable fitting carried on the bracket 128 on the spindle head assembly 12. As shown in FIGS. 8 and 15, a fitting on the bracket 128 is connected by a flexible hose 255 to an inlet port 256 formed in the housing sleeve 211. The port 256 communicates with the passage 257 formed through the housing sleeves 211 and 237. As shown in FIG. 15, the passage 257 communicates with the axial passage 258 formed in the spindle shaft 103. The passage 258 communicates with the passage 259 formed in the lower end of the shaft spindle 103. The spindle shaft passage 259 communicates with the passage 260 formed in the tool 14.

TOOL AND WORKPIECE FIXTURE ENCLOSURE

As shown in FIGS. 2 and 3, the exposed lower end of the spindle 13, the tool 14, the workpiece 16 and the workpiece fixture 17 are enclosed by a combination of the workpiece enclosure 15 and the collapsible accordian boot 264. As shown in FIG. 13, the lower end of the boot 264 is suitably secured to the top wall 265 of the enclosure 15. The lower en dof the boot communicates with the interior of the enclosure 15 through the opening 266. As shown in FIG. 2, the lower end wall 39 of the column portion 23 is provided with an opening 267 through which the boot 264 extends. As shown in FIG. 15, the upper end of the boot 264 is secured to a mounting ring 269 which is adapted to be seated around the lower stepped end of the housing sleeve 211 and to be releasably secured thereto by a pair of releasable lock pins 270. It will be seen that the boot 264 may be quickly mounted in place on the housing sleeve 211 for ready access to the tool 14.

As shown in FIGS. 11 and 13, the fixture enclosure 15 is provided with a bottom plastic wall 271 which is seated on the top wall 65 of the base 10. A suitable insulation 272 is disposed between the wall 271 and the wall 65. Seated inside of the enclosure on the top of the wall 271 is a stainless steel base plate 273 on which is mounted the pedestal 221. The steel plate 273 and the bottom wall 271 is suitably secured to the base wall 65 by the screws 274 and suitable insulating washers 275. The workpiece enclosure 15 is illustrated as being made from a transparent plastic, but other suitable material may be used.

The enclosure 15 includes the side walls 276 and 277 which are connected to the rear wall 217, the top wall 265 and the bottom wall 271 by any suitable means, as by a suitable adhesive. The front end of the enclosure 15 is provided with the integral peripheral flange 278 around an access opening adapted to be closed by the sliding door 279. The door 279 is provided with a knob 282 for manually sliding the door to the left, as viewed in FIG. 11, to the open position shown in FIG. 3. The door 279 is adapted to be slidably mounted in the upper and lower tracks 280 and 281 which extend along the left side wall 276 of the enclosure 15, as shown in FIG. 13. The enclosure 15 is preferably made from plastic to permit inspection of the workpiece and tool during a honing operation. As shown in FIGS. 3, 11, 13 and 54, the electrolyte is drained from the enclosure 15 by a suitable hose 283 which is connected to the lower right rear corner of the enclosure in a suitable manner.

It will be understood that the compartment 26 in the column 11 may be pressurized from a suitable source of air under pressure admitted through a suitable inlet, such as the pipe 284 shown in FIG. 6. The enclosure 15 is vented by a suitable pump means through the vent pipe 285 which is shown in FIG. 13. It will be seen that by keeping the compartment 26 pressurized and at a pressure higher than that maintained in the enclosure 15, the splash and vapor from the electrolytic action and from the electrolyte will not get into the compartment 26 and cause the guide bars, the head and other structure to rust and corrode. The boot 264 which travels with the spindle head assembly aids in retaining the electrolyte splash and vapor down in the enclosure 15.

WORKPIECE FIXTURE

As shown in FIG. 3, the workpiece fixture 17 is mounted on the pedestal 221 which is secured to the steel plate 273 by the screws 286. As shown in FIG. 34, the fixture plate 220 is secured to the pedestal 221 by a plurality of screws 290. The fixture 17 is supported on the pedestal 221 to raise the workpiece 16 closer to the tool 14 so that the tool may be kept at a minimum length. The illustrative workpiece fixture is adapted to hold a gear in a rigid position while a bore formed therethrough is honed. It will be understood that the form of the fixture will be dictated by the workpiece which is to be honed by the honing apparatus. The illustrative fixture holds the workpiece 16 in a position so that the bore 291, as shown in FIG. 36, will be machined concentric to the pitch diameter of the gear 16.

As shown in FIG. 36, the fixture 17 is provided with an insulating ring or sleeve bushing 292 which is disposed in the bore of a boss 293 in a position concentric with the bore 291 in the workpiece 16. The insulated ring 292 prevents removal of metal from the fixture. The ring 292 may be made from any suitable insulating material as, for example, nylon. The ring 292 is secured in the boss 293 by any suitable means, as by screws 294. As shown in FIG. 3, the insulating ring 292 is suitably secured to a drain hose 295 for conducting the electrolyte flowing down through the workpiece bore 291 down into the enclosure 15 so that it may be drained out of the enclosure by the return hose 283. As shown in FIG. 54, the drain hose 283 returns the electrolyte to the reservoir 250.

As best seen in FIG. 34, the gear workpiece 16 is located in position on the fixture by two master pinions 298 and 299. As shown in FIG. 37, the pinions 298 and 299 are rotatably mounted in a suitable manner on the two vertical shafts 300 and 301 which are mounted on the fixture plate 220. As shown in FIGS. 34 and 36, an insulated distributor ring or bushing 302 is mounted in the vertical bore in the plate 225 and is secured thereto by a plurality of screws 303. An annular passage 306 is formed in the plate 225 behind the ring 302 and is supplied with electrolyte under pressure from the passage 305 which is in turn supplied with electrolyte from the hose 304. As shown in FIG. 54, the hose 304 would be connected to the electrolyte supply pump 251. As best seen in FIG. 36, the electrolyte is fed from the annular passage 306 through a plurality of holes 307 which function as discharge ports disposed at an angle of about five degrees. The canting of the discharge holes or ports 307 provides efficient electrolyte distribution and flow between the tool or electrode 14 and the spaced electrolytic shoes, as more fully explained hereinafter.

If desired, a second electrolyte distribution ring may be used in the fixture plate 220 in a position adjacent the lower end of the workpiece 16. As shown in FIGS. 37 and 54, an electrolyte supply hose 308 may have one end connected to the electrolyte supply pump 251 and the other end connected to the entrance of a passage 308a for conducting electrolyte under pressure to the annular distribution passage 309. A plurality of canted discharge holes or ports 310 are formed through the insulated ring 292 for discharging electrolyte under pressure upwardly toward the workpiece 16.

As shown in FIG. 34, the fixture plate 225 which engages the upper end of the workpiece 16 to hold it securely in place on the plate 220, is pivotally supported between a pair of spaced apart arms 313 and 314 by a pair of pivot pins 315 and 316, respectively. The arms 313 and 314 are integrally connected to the rearwardly extended plate or arm 317 which is connected at its rear end to a pair of vertical shafts 318 which permit a slight upward and downward movement of the arm 317 relative to the fixture 220. The arm 317 is adapted to be rocked or slightly pivoted about the vertical post 319 which has its lower end fixed in the plate 220 and the upper end extended upwardly through a suitable aperture in the arm 317. The shaft 319 is provided with suitable lock nuts 320 on the upper end thereof. A spring 321a normally biases the arm 317 upwardly. As shown in FIG. 36, the spring 321a is mounted between the arm 317 and the plate 220, and is disposed around the post or shaft 319. The arm 317 is adapted to be pivoted about the post 319 by the following described structure. As shown in FIGS. 34 and 36, a sloping wedge or cam surface 322 is fixed to the lower side of the pivot arm 317 adjacent the shafts 318. A vertically disposed cam 321 is carried on the rear end of a horizontally movable slide plate 323 which is adapted to be moved forwardly and backwardly. It will be seen from FIG. 36 that when the cam 321 is moved to the right or rearwardly of the fixture, the cam 321 will engage the downwardly sloping surface of the wedge 322 and pivot the arm 317 in a counter-clockwise direction, as viewed in FIG. 36, to bring the plate 225 downwardly into clamping engagement against the workpiece 16. The workpiece may be quickly unclamped by moving the cam 321 to the left as viewed in FIG. 36.

The slide plate 323 is provided with a longitudinally extended slot 324 through which is mounted the pivot post 319. As best seen in FIG. 34, the slide plate 323 is slidably mounted between a pair of guide bars 325 and 326 which are secured to the fixture plate 220 by any suitable means, as by the screws 327. A lever 328 is provided for moving the cam 321 forwardly and backwardly. As best seen in FIG. 34, the lever 328 is pivoted at an intermediate position by the vertical screw 329, and the rear end of the lever 328 is provided with a slot through which is passed the shaft carrying the cam 321. The front end of the lever 328 is pivoted by means of the screw 330 to the rear end of the longitudinally disposed operating rod 331. The rear end of the rod 331 is slidably mounted for forward and rearward motions in a recess 332 which is formed inwardly from the end of the support arm 333 that is fixed to the fixture plate 220 by the screws 334. As best seen in FIG. 34, the front end of the rod 331 is provided with a screw end 335 which is slidably mounted through a suitable hole in the support bracket 336 that is secured to the plate 220 by the screws 337. An operating knob 338 provided with a suitable cross bar is threadably mounted on the outer end of the screw end 335. It will be seen that when the knob 338 is threaded clockwise, the rod 331 will be moved forwardly, as viewed in FIG. 34, which will result in the cam 321 being moved rearwardly to pivot the clamping arm 317 in a direction to clamp the workpiece 16 in the fixture.

The workpiece fixture may be adapted with minimum changeover to rotate the workpiece 16 during the honing operation. Rotation of the workpiece is desirable if there is any deviation in a workpiece tooth thickness. Rotation of the workpiece during honing minimizes the bore errors that may be influenced by the deviation in tooth thickness. In order to bring the electric current to the workpiece while it is rotated the two brushes 226 and 226a are engaged with the outer surface of the gear hub as it is rotated. As shown in FIGS. 36 and 37, the brushes 226 and 226a are mounted in a suitable insulated block 341 carried on the underside of the pivot arm 317 and secured thereto by any suitable means, as by screws 342. The brushes 226 and 226a may be biased toward the workpiece 16 by any suitable means, as by the springs 343. As shown in FIGS. 36 and 37, the fixture is provided with a stop 344 on the upper face of the plate 220.

FIG. 38 illustrates a modified fixture in which the electrolyte is forced upwardly between the workpiece 349 and the tool 14 from a pot 345 formed in a pedestal 221a. The electrolyte would be supplied from an electrolyte reservoir as 250, then passed through the passage 346 into the pot 345. The fixture metal plate 347 would be mounted on suitable insulation 348 carried on the pedestal 221a. A suitable clamping member 350 would hold the workpiece 349 on the plate 347. Electric current would be supplied to the fixture member 350 by the cable 351.

FIGS. 39 and 40 illustrate means for rotating the workpiece 16 during a honing operation. As shown in FIG. 40, one of the locating pinions 299a would be rotatably mounted by a suitable bearing 355 in the fixture plate 220. The shaft 301a carrying the pinion 299a would be provided with an extension 357 which extends downwardly through the bore 356 in the boss 358 formed integrally with the pedestal 221. The shaft extension 357 would be journalled in suitable bushings 359 and 360 carried in the boss 358. A drive gear 361 is fixed to the lower end of the shaft extension 357 and secured thereto against axial movement by the lock nuts 362.

As shown in FIG. 39, the gear 361 is driven by a worm gear 363 fixed on the end of a shaft 364 and secured thereto by a suitable key and lock nut 365. The shaft 364 is integral with an enlarged shaft 366 that is fixed in driving relation to the output shaft 367 of a suitable hydraulic or electric drive motor 368. The motor 368 is carried on the bracket 369 which is secured by bolts 370 to the motor 368. The bracket 369 is secured to the pedestal 221 by suitable screws 371. It will be seen that when the motor 368 is operated, the workpiece 16 will be rotated. The workpiece stays on the pre-positioned centerline of the fixture and any variation in tooth thickness will be randomized.

TOOL

It will be understood that the tool 14 is illustrated herein as being rigidly connected to the spindle 13. However, it will be understood that the tool 14 may be connected by suitable means to the spindle 13 to permit the tool to float. It will also be understood that the workpiece 16 may be mounted in a suitable fixture to permit it to float during a honing operation. The selection of a rigid or floating connection between the tool 14 and the spindle 13 would depend on the particular workpiece being honed.

A ball adaptor is illustrated in FIGS. 46 and 47 to illustrate one type of structure for mounting the tool 14 in a floating condition relative to the spindle 13. The numeral 242a indicates a flange which could be used to adapt the spindle to a floating condition relative to the tool 14. As shown in FIG. 46, the flange 242a is provided with a concave surface on which is adapted to be seated an adaptor member 376 having a mating convex surface. A plurality of balls 377 are seated in mating recesses and slots formed in the flange 242a in the adaptor member 376. The adaptor member 376 is provided with a bore 378 for the reception of the lower end of the spindle 13 for connection to the upper end of the tool 14. A retainer ring 379 provided with a hole therethrough having a curved surface adapted to mate with the curved surface of the adaptor 376 is mounted in the flange 242a to hold the adaptor member 376 in place. The retainer ring 379 is secured in place by any suitable means, as by a plurality of set screws 380.

As explained hereinbefore, a universal type of floating tool and a floating fixture could be employed in the electrochemical honing process of the present invention. In the particular illustration shown herein a rigid setup is used. As shown in FIG. 18, the tool 14 is provided with the upper body portion 385 and a lower body portion 386. The body portion 385 is provided with a reduced upper end 383 which is adapted to be received in the lower end of the spindle shaft of the spindle 13 and to be secured in a rigid connection therewith by means of the collar 245 and the flange 384 which is formed on the tool upper body portion 385. The tool 14 includes a cone rod 388 which is movably mounted in the axial bore 387 formed in the tool upper body portion 385. As shown in FIG. 17, the upper end of the cone rod 388 is provided with a suitable connection member shown in the form of a C connector for attachment to the mating connection member 148 shown in FIG. 15. The cone rod 388 is provided with an enlarged portion or cone 390 which is slidably mounted in the bore 391 of the tool lower body portion 386, as shown in FIG. 18. As shown in FIG. 20, the tool lower body portion 386 is releasably secured to the lower end of the upper body portion 385 by the screws 394 and a dowel pin 395.

As shown in FIGS. 18 and 20, the cone rod 388 carries the cone 390 which is provided on the outer surface thereof with a plurality of radially disposed, circumferentially spaced, longitudinally extended slots or recesses 397 for conveying electrolyte downwardly through the tool for discharge out through the ports 398 and into operative engagement with the workpiece surface. As shown in FIG. 17, the tool portion 385 is provided with a plurality of the passages 260. As shown in FIG. 18, each of the slots 397 is supplied with electrolyte through a port 396 which is connected to an individual passage 260 formed in the tool upper body portion 385. As shown in FIG. 15, each of the passages 260 communicates with the passages 258 and 259 which in turn communicate with the annular passage 257 that is connected to the inlet passage 256. As shown in FIG. 23, the electrolyte is discharged through the ports 398 into engagement with the surface of the workpiece which is to be honed. The ports 398 are shown as being disposed at right angles to the slots 397. However, it will be understood that the ports 398 may be canted downwardly. FIG. 22 shows a modification wherein the discharge ports 398a have been canted downwardly to direct a flow of electrolyte in the gap between the tool 14 and the workpiece 16. The ports 398 may also be canted on a plane not perpendicular to the radius of the tool body and at angles relative to radial lines through the tool body.

As shown in FIG. 19, the cone 390 is adapted to bias a plurality of honing stones 399 outwardly into honing engagement with the surface of the workpiece 16. The tool 14 illustrated in FIG. 20 is provided with three honing stones 399. As shown in FIG. 19, each of the stones 399 is mounted in the usual mounting shell made from a plastic that wears away evenly as the stones 399 are consumed. The stones 399 are adapted to protrude outwardly through the openings 400 formed through the side wall of the tool lower portion 386. The stones 399 are disposed so that their carriers or holders 401 are mounted in the wedge or cam slot 402 formed in the lower end of the cone 390. It will be understood that when the cone 390 is moved downwardly by the aforedescribed fluid pressure system for operating the cone, the honing stones 399 will be moved outwardly into abrading engagement with the surface of the workpiece 16 in the usual manner.

The tool 14 is provided with a plurality of bore sizing gauge arms generally indicated by the numeral 406, as shown in FIG. 19. The gauge arms 406 also carry means for controlling the gap between the outer surface of the tool lower body portion 386 and the surface of the workpiece 16, as explained more fully hereinafter.

As will be understood from FIGS. 19 and 21, the cone 390 is provided with three radially disposed, circumferentially spaced, longitudinally directed slots 407 in each of which is hingedly mounted a gauge arm 406. As best seen in FIG. 19, each of the gauge arms 406 is pivoted on a pivot pin 408 which is carried in a block 409 that is disposed in a recess or opening 410 formed in the side of the tool upper body portion 385. As shown in FIG. 21, the outer ends of the pins 408 are seated in suitable bores 409a formed in the tool upper body portion 385. Each of the blocks 409 is adapted to be secured to its respective gauge arm 406 by any suitable means, as by the screws 411. As shown in FIG. 19, each gauge arm 406 is provided with a lower end portion 412 which is hinged at 413 to the main portion of the gauge arm.

As shown in FIG. 20, the tool portion 386 is provided with three longitudinal slots 415 which communicate with the slots 407 formed in the cone 390. Seated in each of the slots 415 and secured to a gauge arm 406 is an elongated bar or member 414 which may be called a shoe. The shoes 414 are secured to their respective gauge arm 406 by any suitable means, as by screws 416. As shown in FIG. 19, each shoe 414 is provided with a plurality of spaced apart diamonds 417 which are adjustably mounted in the shoe. The diamonds 417 protrude outwardly beyond the surface of the shoes 414 and are adapted to engage the surface of the workpiece 16 and maintain the desired gap between the surface of the tool lower body portion 386 and the workpiece during a honing operation. It will be understood that other materials may be used instead of diamonds. For example, a suitable ceramic material may be used. The diamonds function as non-conductive, non-wearing surfaces to maintain the gap between the workpiece and the tool. It will be understood that the spacing between the shoe 414 and the gauge arm 406 may be adjusted by means of the setting of the gauge screws 416. The adjusting of the diamonds 417 relative to each shoe 414 also provides a means for adjusting the gap between the workpiece and the tool. As shown in FIG. 17, each of the shoes 414 is adapted to be electrically connected to the tool upper body portion 385 of the tool 14 by a suitable cable 420 which is fixed to the shoe and which has the upper end thereof secured to the tool upper body portion 385 by a screw 421.

As shown in FIG. 19, the tool 14 is provided with an annular or cylindrical manifold 423 which is secured to the tool portion 385 by screws 424. The manifold 423 has a portion spaced from the tool body to form the annular chamber 422 which is adapted to convey air under pressure into engagement with each of the gauging arms 406, as described hereinafter. It will be understood that one or more gauge arms 406 may be used when honing a bore or other work surface. As described hereinbefore, air under pressure is conducted into the passage 241, as shown in FIG. 18, which in turn is conveyed into the manifold chamber 422.

As shown in FIG. 19, the air under pressure in the chamber 422 is adapted to pass through the passage 428 formed in the nozzle 426 and which terminates in the nozzle head 427. Each of the gauge arms 406 is adapted to be pivoted about a hinge pin 408 by means of a spring 445 which is mounted in a bore in the tool portion 385 and adapted to be engaged with the upper end of the gauge arm 406. The tension of the spring 445 may be adjusted by a suitable set screw 446.

It will be seen that for a predetermined setting of the distance or gap between the nozzle head 427 and the gauge arm 406 a certain back pressure will be maintained in the chamber 422. As the gauge arm 406 swings outwardly as the bore of the workpiece is increased, the upper end of the gauge arm 406 will move inwardly to increase the gap between the nozzle head 427 and the gauge arm 406. The last mentioned increase in gap will decrease the back pressure in the chamber 422, and this decrease in back pressure may be sensed and converted to an electronic signal to operate a shut-off switch or the like for the honing apparatus. The decreasing pressure in the chamber 422 may also be sensed to indicate that the selected bore size has been reached by means of a visual or audio signalling means. United States Patent 3,059,381 to John H. Greening et al. discloses a pneumatic and electrical control mechanism which may be used to sense the change in back pressure in the chamber 422 for control purposes.

The change in pressure in the chamber 422 may also be sensed by a suitable transducer, as indicated by the numeral 429 in FIG. 52. The transducer 429 would be connected in a suitable location in the pressurized air line which is connected to the chamber 422.

FIGS. 49 and 50 illustrate a suitable type of transducer which may be used to sense the variation in pressure in the chamber 422 and convert it to a control signal. As shown in FIG. 50, the transducer 429 includes a metal bottom member 430 on which is seated a suitable thin, flexible diaphragm member 431. A metal annular spacer 432 is seated on the diaphragm 431. The transducer is enclosed on the upper end by the top metal member 433. The last described portions of the transducer are secured together by any suitable means, as by the bolts 434. An inlet port 436 is formed through the bottom member 430 for admitting pressure from the chamber 422 into the chamber 437 in the transducer 429. The space above the diaphragm 431 comprises a separate chamber or cavity 435 in which is mounted the metal plate 438. The plate 438 is carried by a plastic support member 439 which is adjustably secured to the top member 433 by screws 440. The metal plate 438 is connected by the wire 441 to the center conductor 442. The connector member 443 is electrically connected to the top member 433 and forms a part of the coaxial conductor, as indicated by the 443. It will be seen that the diaphragm member 431 functions as a deflectable plate of a variable capacitor in a well-known manner. The setting of the plate 438 relative to the diaphragm 431 may be adjusted by the screws 440 for calibrating the transducer, as desired. The transducer 429 is adapted to provide a change in an electrical characteristic responsive to fluid pressure, and any suitable electronic control circuit may be connected to the transducer 429 whereby an electrical signal can be produced having a magnitude varying in accordance with the magnitude of the capacitor of the capacitance of the transducer which varies in accordance with the variations of air pressure received by the transducer. FIG. 52 shows the transducer 429 connected to a suitable electronic module 444 for providing an electronic control signal for controlling the stopping of the operation of the tool when a predetermined bore size has been reached. Any suitable electronic control circuit may be used. An illustrative circuitry which may be used would be one shown in United States Patent No. 2,635,748 or United States Patent No. 2,908,980. It will be understood, however, that other suitable circuitry may be employed.

FIGS. 24, 25 and 26 illustrate three modified air-electronic sizing devices which may be employed with the tool 14. In the embodiments of FIGS. 24, 25 and 26, air under pressure is conveyed through the body of the tool to two or more air jet nozzles which are located adjacent to the flexible arms that are attached to expanding shoes which contact the bore 291 of the workpiece with a light pressure during the honing cycle. The length of the shoes may be equal to or greater than the length of the honing stones. The shoes are illustrated as being expanded by centrifugal force. The flexible arm construction would collapse the shoes during a withdrawal cycle. It will be understood that the shoes of FIGS. 24, 25 and 26 may be expanded by suitable spring means.

Referring in particular to FIG. 24, the numeral 447 indicates a shoe which is provided with permanently mounted diamonds 455. The shoe 447 extends outwardly through a slot 448 formed through the tool portion 386a. The tool is indicated by the numeral 14a. Formed on the back of each shoe 447 is a downwardly and inwardly sloping cam surface 449 which is adapted to be engaged by the rounded end of a gauge rod 450 which is slidably mounted in a bore 451 in a support block 452 disposed in a suitable elongated slot in the tool portion 386a. The rod 450 is provided with a head 453 which is disposed in alignment with the nozzle end of a fluid pressure tube 454 having a passage 241a. It will be understood that air under pressure is supplied to the passage 241a in the same manner as described hereinbefore under the discussion of the embodiment of FIGS. 17 through 21. As the shoe 447 is moved outwardly due to centrifugal force, the rod 450 will move downwardly and the space 456 between the rod head 453 and the nozzle at the end of the passage 241a will increase, thereby decreasing pressure in the passage 241a. The decrease in pressure in passage 241a is sensed by a transducer such as the transducer 429 for conversion to an electronic control signal, as described hereinbefore for the previously discussed embodiment.

FIG. 25 shows a similar shoe 457 which is provided with permanently mounted diamonds on the outer face thereof for engagement with the bore 291 of the workpiece 16 for spacing the tool portion 386b therefrom. The shoe 457 would protrude outwardly through the slot 458, and it is carried on the arm 459 and secured thereto by the screws 460. The end of the gauge arm 459 opposite to the shoe end is secured to a support member 465 which may be a portion of the tool 14b. The upper end of the arm 459 would be secured to the support member 465 by the screws 461. A notch 462 may be provided in the gauge arm 459 to permit movement of the lower end of the arm 459 and function as a hinge at that point. The nozzle 463 is positioned opposite the upper end of the gauge arm 459 and is disposed at a predetermined spacing 464 therefrom. The nozzle 463 is fed with air under pressure from the passage 241b which is supplied with air under pressure in the same manner as the first described embodiment. It will be seen that as the shoe 457 is moved outwardly, the space 464 between the nozzle 463 and the arm 459 will decrease thereby building up a back pressure in the passage 241b which may be sensed by a transducer as 429 and transformed to an electrical signal to register the bore size on a visual gauge and provide a signal to terminate the honing cycle.

FIGS. 26, 27 and 28 illustrate a sizing tool arrangement which is similar to that of FIG. 25, and the same reference numerals have been used followed by the small letter "a." The difference between the structure shown in FIGS. 25 and 26 is that the nozzle 463a is disposed on the inboard side of the gauge arm 459a so that it will sense a decreasing pressure instead of an increasing pressure as in the case of FIG. 25 wherein the nozzle 463 is disposed on the outboard side of the gauge arm 459. As shown in FIG. 28, the tool 386c may be provided with an elongated, longitudinally disposed slot 466 into which is communicated the discharge ports 398c. The diamond impregnated shoes 447 and 457 of the embodiments of FIGS.

24 through 26 serve as both a cathode and expanding shoes for size control.

FIG. 29 illustrates a tool 14d made in accordance with the principles of the present invention and in which the gauge arm 406d is mounted in a different manner than that shown in the mounting of the gauge arm in FIG. 19. Also, the air sizing nozzle means is disposed in an outer position as compared to the inner position of the nozzle 426 of FIG. 19. The parts of the tool of FIG. 29 which are the same as the parts of the embodiment of FIGS. 17 through 21 have been marked with the same reference numerals followed by a small "d."

As shown in FIG. 29, a movable portion of gauge arm 406d is connected by a pair of spaced apart, parallel reeds 469 to a fixed end 470 that is secured to the tool body portion 385d by any suitable means, as by the screws 471 and 472. A sizing nozzle block 473 is secured to the tool body portion 385d by the screws 474, as shown in FIG. 2. It will be seen that the embodiment of FIG. 29 is the type of tool which is attached to the spindle 13 in FIG. 2. The nozzle block 473 is provided on the lower side thereof with an undercut 475 which communicates with the opening 410d in the side of the tool body portion 385d. A gauge pin or plug 476 is threadably secured to the movable portion of the gauge arm 406d at a position adjacent the reeds 469. The plug 476 extends laterally outward through the opening 410d into the undercut 475 and terminates in close proximity to the inner end of an adjustably mounted nozzle 481. The numeral 477 indicates the threaded connection of the plug 476 to the gauge arm 406d.

The nozzle plug 481 is threadably mounted in the hole 480 formed through the nozzle block 473, and in a position axially aligned with the plug 476. The nozzle plug 481 is adapted to be secured in an adjusted position in the hole 480 by the set screw 482. The nozzle plug 481 is adjusted until the inner end thereof is spaced apart a predetermined distance from the outer end of the plug 476. The numeral 483 indicates the space between the outer end of the plug 476 and the inner end of the nozzle plug 481.

As shown in FIG. 29, the tool 14d is provided with a passage 241d for delivering air under pressure to the chamber 422d formed in the manifold 423d. The air under pressure is adapted to flow out of the chamber 422d through an outlet 488 into a suitable hose 489 which conveys the air into the inlet passage 487 in the nozzle block 473. The inlet passage 487 is connected to the bore 480 and air under pressure will flow into said bore and into the annular recess 485 formed around the inner end of the nozzle plug 481. The pressurized air then flows through the port 486 into the axial passage 484 formed in the nozzle plug 481. As shown in FIG. 29, the inner end of the passage 484 is open to the atmosphere and the air under pressure discharges against the outer end of the plug 476.

In use, the tool illustrated in FIG. 29 would function in substantially the same manner as the tool illustrated in FIG. 19. The hinge reeds 469 would provide a normal outward bias to the gauge arm 406d so as to move the shoe 414d outwardly into engagement with the bore work surface. It will be understood that one or more gauge arms 406d may be employed if the workpiece is a bore type surface. It will be seen that as the honing operation proceeds, the arm 406d will move outwardly and the space 483 between the outer end of the plug 476 and the inner end of the nozzle plug 481 will decrease. A corresponding increase in back pressure in the hose 489 and its related air pressure supply system will occur. The increase in back pressure is sensed by a suitable transducer as, for example, the transducer 429, and these variations are converted into an electronic signal by an electronic module as shown in FIG. 52 by module 444. The pin 490 is a gauge arm collapsing pin. The tapered lowered end of the gauge arm 406d engages the pin 490 during a collapsing movement and cams the gauge arm inwardly to the collapsed position shown in FIG. 29.

FIGS. 30 and 31 illustrate a further hinge type sizing gauge assembly made in accordance with the principles of the invention. The parts of the sizing gauge assembly shown in FIGS. 30 and 31 which are the same as the parts in the first described embodiment of FIG. 19 are marked with the same reference numerals followed by the smaller letter "e." A gauging block 473e is employed and would be constructed and operated in the same manner as the block 473 employed in the gauging assembly of FIG. 29. The difference between the embodiment of FIGS. 30 and 31, and the embodiment of FIG. 29 is in the means for mounting the gauge arm 406e on the gauge body portion 385e. FIGS. 30 and 31 illustrate a tool 14e made in accordance with the principles of the present invention, and in which the gauge arm 406e is mounted in a different manner than that shown in the mounting of the gauge arm 406 in FIG. 19.

As shown in FIG. 30, the upper part of the gauge arm 406e is made as a separate rocker arm indicated by the numeral 492. The rocker arm part 492 is held by a screw 494 which has a plain inner end seated in the hole 493, in the rocker part 492. The screw 494 is threaded through the tool upper portion 385e and is locked in an adjusted position by means of the lock nut 495. The upper end of the rocker part, indicated by the numeral 499, is engaged on the outer side by the round nose 498 of a spring biased plunger carried in the screw 496 threaded through the tool portion 385e and adapted to be locked in an adjusted position by the lock nut 497. The rocker arm part 492 is provided with an offset arm 500 on the lower end thereof, and the inner side of the arm 500 engages the outer side of the extension or arm 501 carried on the upper end of the main body of the gauge arm 406e to retract or collapse the gauge arm 406e from the bore.

As shown in FIG. 31, the lower end of the gauge arm 406e is connected by the reed or leaf spring 503 to the plug 508 which is mounted in the lower end of the tool body portion 386e. The reed type hinge construction is adapted to provide long tool life. A pin type hinge could also be employed in place of the reed type hinge.

As shown in FIG. 31, the lower end of the gauge arm 406e is indicated by the numeral 502 and it is connected to the upper end of the reed 503 by the retainer bar 504 and the screws 505. The lower end of the reed 503 is fixed to the plug 508 by the retainer bar 506 and the screws 507. The plug 508 is connected to the transverse wall member 510 by the screw 509. The wall 510 is fixed in place in the tool portion 386e by a screw or the dowel pin 511. The plug 508 is fixed against rotation by the dowell pin 512. The lower end of the gauge arm 406e is seated in the slots 513 and 514 in the wall 510 and plug 508, respectively.

In use, the tool illustrated in FIGS. 30 and 31 would function in substantially the same manner as the tool illustrated in FIG. 19. The leaf spring or reed 503 would provide a normal outward bias to the gauge arm 406e so as to move the shoe 414e outwardly into engagement with the surface of the workpiece being machined. It will be understood that one or more gauge arms 406e would be provided if the work surface is a bore type surface. It will be seen that as the honing operation proceeds, the arm 406e will move outwardly and the space 483e between the outer end of the plug 476e and the inner end of the nozzle plug 481e will decrease. A corresponding increase in back pressure in the air sizing circuit will occur. The increase in back pressure is sensed by a transducer and a control signal is produced in the same manner as described hereinbefore for the embodiment of FIG. 29. The original setting of the nozzle 481e is made by adjusting the nozzle 481e in the bore 480e. The reed 503 may be of any suitable thickness. A thickness of approximately .030" has been found to be a practical dimension. The embodiment of FIG. 30 offers a more accurate control over the embodiment of FIG. 29 because of the larger amount of movement produced by the arm 406e on the gauge plug 476e.

FIG. 32 illustrates a modified construction of a movable gauge plug or button assembly which may be employed with gauging arms made in accordance with the principles of the present invention as, for example, the gauging arm shown in FIGS. 29 and 30. The nozzle gauge block 473f includes the same structure as the corresponding block 473 shown in FIG. 29, and the parts thereof have been marked with the same reference numerals followed by the small letter "f." The nozzle block 473f would be secured to the tool body portion 385f in the same manner that nozzle block 473 is secured to the tool body 385. The embodiment of FIG. 32 provides a parallel reed motion assembly. As shown in FIGS. 32 and 33, one end of each of a pair of reed members 519 and 520 is fixed to the nozzle block 473f by a pair of channel members 515 and 517, the spacer member 516, and the screw 518. The outer ends of the reeds 519 and 520 are connected together by a similar construction of a pair of channel members 515a and 517, the spacer member 516a, and the screws or buttons 522. An adjustable pin 476f is threaded in the gauge arm 406f and is adapted to abut the inner button 522. It will be seen that when the gauge arm 406f is moved outwardly, the space or gap 483f between the outer button 522 and the inner end of the gauge plug 481f will be decreased, thereby creating a back pressure in the air pressure supply line. The increase in back pressure is then sensed and converted into a control signal as described hereinabove in the embodiments of FIGS. 29 and 30.

FIG. 55 illustrates a modified tool wherein the electrolyte is adapted to be supplied through the tool and through the abrasive means and the support shoe means. Although FIG. 55 shows the electrolyte as being supplied through both the abrasive means and the support shoe means, it will be understood that the electrolyte may be supplied separately through either the abrasive means or the support shoe means. FIG. 55 illustrates a fragmentary portion of a tool similar to that shown in FIG. 19. The parts of the tool of FIG. 55 which are the same as parts of the tool shown in FIG. 19 have been marked with the same reference numerals followed by the small letter "h."

The tool in FIG. 55 is provided with a passage 605, formed through the cone 390h, which is adapted to be connected to a suitable source of electrolyte under pressure. The electrolyte flows from the passage 605 into the elongated chamber 606 which communicates with a plurality of spaced apart passages 607 formed in the abrasive means holder 401h. The abrasive means 399h is made from a suitable porous abrasive material so that the electrolyte under pressure is forced through the abrasive means 399h into operative engagement with the surface of a workpiece. It will be understood that the abrasive means 399h may be made from an electrically conductive abrasive material or from a nonconductive abrasive material. It will also be understood that the electrolyte flow construction of FIG. 55 may be incorporated in a tool which has one or more abrasive means or stones.

FIG. 55 also shows the tool as being provided with means for flowing electrolyte through the supporting shoe means, which in the illustrative embodiment includes a gauge arm 406h on which is operatively carried the shoe 414h. A second passage 608 is formed through the cone 390h and supplies electrolyte under pressure to a plurality of spaced apart passages extended through the last mentioned gauge arm and shoe and into operative engagement with the work surface of the workpiece. The last mentioned passages are formed by a plurality of interconnecting transverse passages as 609, 610 and 611. It will be understood that the last mentioned passages could be formed directly through a shoe, as 414h, if it were mounted on a tool which was not provided with a gauging arm as 406h. It will also be understood that one or more support shoes having electrolyte passages formed therethrough may be employed.

MODIFIED TOOL

FIGS. 41 through 45 illustrate a modified tool construction in which the brush rig 208g is mounted directly on the tool instead of on the spindle as in the first embodiment of FIG. 15. This second tool embodiment does not have a passage through the spindle for feeding the electrolyte to the tool. The electrolyte is conveyed through passages in the tool after it is received from the housing 545, as explained hereinafter. The pressurized air for the bore sizing apparatus is conveyed directly to the tool instead. The embodiment of FIGS. 41 through 45 functions in substantially the same manner as the previously described first embodiment, and the same parts thereof have been marked with the corresponding reference numerals followed by the small letter "g." As shown in FIG. 41, the spindle 13g would be provided with a passage 528 for conveying fluid under pressure into the axial bore or passage 529 and into the cylinder 530, for moving the piston 531 downwardly. The piston 531 is connected by means of the pin 532 to the rod 533. The spring 534 normally biases the piston 531 and the rod 533 upwardly to retract the honing stones 556, as shown in FIG. 43. Fluid under pressure is admitted to the passage 528 by a suitable Deublin coupling 118g in the same manner as described hereinbefore for the first embodiment.

As shown in FIG. 41, the spring 534 abuts the wall 535 mounted in an increased diameter portion of the cylinder or bore 530. The rod 533 is connected to a cone rod 388g for advancing the honing stones 556 in the usual manner. The shaft 533 is prevented from rotating by a pin 536 carried in the spindle shaft 103g and which has the inner end thereof extended into the longitudinal slot 537 in the shaft 533. The shaft 533 is further provided with a pair of spaced apart pistons 538 and a lower end of connector rod 539 carries the connection member 148g. The lower end of the spindle shaft 103g is connected in a manner similar to the first embodiment to a tool 14g which is illustrated in FIGS. 42 and 43. A collar 540 threadably connects the threaded shaft portion 541 of the tool to the lower end of the spindle shaft 103g.

As shown in FIG. 41, the spindle 103g is rotatably mounted in the bore 525 in the spindle housing sleeve 526. The sleeve 526 is secured to the spindle housing 45g by the screws 527. A suitable packing 542 surrounds the spindle shaft 103g at the point where it extends out of the sleeve 526. A seal 543 is mounted between the two guide pistons 538. It will be understood that the spindle shaft 103g is adapted to be driven in the same manner as described hereinbefore for the shaft 103 of the first embodiment.

As illustrated in FIG. 43, a cylindrical housing 545 is adapted to rotatably support the tool 14g and to be restrained from rotating during a honing operation. As shown in FIG. 43, the tool body upper portion indicated by the numeral 546 is adapted to be rotatably mounted in the housing 545 by the spaced apart ball bearing means 547 and 548. The tool body portion 546 is secured against endward movement relative to the housing 545 by the threaded lock ring 549. The housing 545 has secured to the upper end thereof a brush rig 209g by the collar 550, the collar 551, and the screws 544 and 552. The upper portion 546 of the tool 14g is hollow and contains the cylindrical body 553 which is retained in position by the pin 554. As shown in FIG. 43, the cone rod 388g is slidably mounted through a suitable axial bore formed in the cylindrical body 553. A cone member 390g carries a plurality of honing stones 556 which protrude out through slots 557 into operative engagement with a workpiece surface. The stones 556 are moved outwardly by the usual sloping wedge surfaces 558 formed on the cone 390g.

As shown in FIG. 43, the housing 545 is provided with an inlet port 560 for the reception of electrolyte from a source as described hereinbefore for the first embodiment. The electrolyte passes into the annular passage 561 and thence into individual passages 562 for feeding individual longitudinally disposed passages 563 in the same manner as described hereinbefore for the first embodiment. As shown in FIGS. 44 and 45, the electrolyte is discharged outwardly onto the surface of a workpiece through the ports 564 disposed in the lower portion 565 of the tool 14g. As shown in FIG. 43, the tool 14g is provided with an air sizing gauge means comprising the elongated gauge arm 568 which is provided with a notch 569 adjacent the upper fixed end 570. The gauge arm end 570 is secured to the cylindrical body 553 by a pair of screws 571. The gauge arm 568 is disposed in a longitudinal slot 575 formed in the outer periphery of the body 553. It will be understood that the tool 14g is provided with one or more gauging means, as shown in FIG. 45. Secured to the lower end of the gauge arm 568 is a shoe 572 which is provided with fixed diamonds 581, or any other suitable non-wearing, non-conductive members. It will be understood that adjustably mounted diamonds may also be employed, as illustrated in the embodiment of FIG. 19. The shoe 572 is connected to its gauge arm 568 by the screw 573. The shoe 572 protrudes outwardly from the tool through the slot 574 formed through the wall of the lower portion 565 of the tool 14g. It will be understood that the gauge arm 568 functions as a spring arm which has a natural outward bias for swinging movement about the notched upper end.

As shown in FIG. 43, pressurized air for operating the bore sizing apparatus is admitted through the pipe 576 from a suitable source as explained hereinbefore for the first embodiment. The pressurized air enters the annular passage 577 and passes into each of the nozzle fittings 578 for each gauge arm 568. Each of the nozzle fittings 578 is provided with a passage 579 therethrough which terminates at the inner end of the nozzle 580. It will be seen that as the gauge arm 568 moves outwardly with an increasing bore size, the distance or gap between the nozzle 580 and the gauge arm 568 will decrease resulting in an increase of pressure in the air supply line. The change in pressure will be sensed by a transducer as described hereinbefore for the first embodiment and converted to a control signal.

As shown in FIG. 43, the electrolyte annular passage 561 is sealed by a pair of suitable rotary sealing means 582 and 583. The air supply annular passage 577 is sealed in a similar manner by the rotary sealing means 583 and 584.

MODIFIED FIXTURES

FIG. 48 schematically illustrates a modified workpiece fixture for holding a workpiece 594 in a floating position. The numeral 585 generally indicates a workpiece fixture which incorporates a ball adaptor construction similar to the ball adaptor tool connection means illustrated in FIGS. 46 and 47. The fixture 585 includes a cavity or recess 586 on the upper side thereof which is formed with concave peripheral surfaces, as indicated by the numeral 587. A plurality of balls 588 are mounted in an annular recess in the side wall surface of the cavity 586 and are adapted to abut a peripheral convex surface formed on the plate 589. The outer peripheral surface of the plate 589 is adapted to mate with and be seated on the concave surface 587. The plate 589 is retained in the fixture 585 by the retainer ring 590 and screws 591. The plate 589 contains an upper insulated sleeve 593 which is aligned with a lower insulating sleeve 592 formed in the main body of the fixture 585. A suitable clamp 595 holds the workpiece 594 on the plate 589 and is secured in place by the screws 596. The insulation sleeve 593 is provided with discharge ports 600 for discharging electrolyte onto the surface of the workpiece 594, in the same manner as described hereinbefore for the first fixture embodiment. The electrolyte is supplied from a suitable source through the hose 599, the passage 598, and the annular passage 597. It will be understood that the clamp 595 and the plate 589 may be operatively connected to a suitable source of D.C. current for an electrochemical honing operation.

FIG. 56 schematically illustrates a modified workpiece fixture adapted to distribute the electrolyte through the fixture and workpiece into operative engagement against the surfaces of the tool and workpiece. The numeral 614 generally indicates a workpiece fixture which is provided with a bore 622 in which is adapted to be seated a workpiece 617. The bore 622 is provided with an annular distribution recess or chamber 615 which is supplied with electrolyte under pressure from a suitable source through the inlet port 616. The workpiece 617 is provided with a bore 618 which is to be honed by a tool made in accordance with the principles of the present invention. A pair of suitable O-ring sealing means 620 and 621 are mounted in the fixture 614, around the bore 622, so as to engage the outer surface of the workpiece 617. Although the workpiece 617 is illustrated as being cylindrical in cross sectional shape, it will be understood that a workpiece having a different cross sectional shape may be employed and the bore 622 would be made to correspond to the outer configuration of the workpiece 617. The workpiece 617 is provided with a plurality of spaced apart passages 619 to permit the electrolyte under pressure to flow from the annular chamber 615 into the bore 618 for operative engagement with the surfaces of the bore 618 and the tool employed for honing this bore.

OPERATION

As shown in FIG. 53, the operation of the spindle, the flow of electrolyte, and the flow of electrical power may be controlled by a suitable control circuit. The control circuit of FIG. 53 is merely an illustrative circuit and control circuits of this type are within the realm of selection by the skilled mechanic. Any one of said control circuits may be employed to accomplish the desired function in the proper sequence and in the desired time relation.

The sequence of operations for a honing operation is initiated with the tool 14 in a fully raised position and with the honing stones retracted. Two options are provided, namely, the cycle may be set for a certain size or a certain time period. The "cycle start" button shown in the upper left hand corner of the circuit of FIG. 53 is pressed, and the relay 1CR is energised and sealed in by the relay contacts or switch 1CR1. A second set of relay contacts 1CR1 also closes to energize the solenoid 102 in the hydraulic control circuit for the fluid cylinders 63 and 64. The spindle head assembly 12 begins reciprocating upwardly and downwardly and at the bottom of the first stroke the switch shown in the fourth line in the upper left hand corner of the diagram of FIG. 53 is operated to energize the spindle relay 2M. The electrolyte relay 3CR is also energized when the cycle starts by a third set of relay contacts 1CR1. The operation of relay 3CR closes the contacts 3CR1 to energize the electrolyte pump 250.

The energizing of the spindle relay 2M closes the contacts 2M1 and 2M2 for energizing the spindle drive motor 199 and the low feed relay 2CR respectively. The energizing of the low feed relay 2CR closes the contacts 2CR1 and 2CR2. The closing of the contacts 2RC1 energizes the low pressure solenoid 140. The closing of the contacts 2CR2 energizes the high feed relay 4CR. The energizing of the relay 4CR closes the contacts 4CR1 to energize the high pressure solenoid 138. The energizing of the high feed relay 4CR also closes the contacts 4CR2 which turns on the D.C. power by energizing the relay 5CR to close the contacts 5CR in the D.C. power supply circuit.

Assuming that the cycle selector switch, shown in the last line in the left hand lower corner of the diagram of FIG. 53, has been set to a certain time cycle, the high feed relay 4CR will also close the contacts 4CR3 to energize the cycle timer relay 1TD. When the cycle timer is timed out the normally open contacts 1TD1 and 1TD2 will be closed to energize the run out timer relay 2TD and to energize the solenoid 142 to operate the collapsing air pressure circuit. Simultaneously, the high pressure feed and the D.C. power are dropped. A timed, low presure run out period then occurs which uses only the abrasives and not the electrolytic action. When the run out timer times out, the cycle is terminated. The high feed is dropped when the cycle timer relay 1TD times out by the opening of the normally closed contacts 1TD3.

If the cycle selector switch is set to a certain size, the run out timer relay 2TD will be energized by the closing of the normally open contacts CRE1 when the workpiece reaches said certain size, if this happens before the cycle timer times out. If said certain size is reached before the cycle timer times out, the normally closed contacts CRE3 open to drop the high feed and the D.C. power. It will be understood that suitable manual controls may be provided for test and set-up purposes.

Experience has shown that the combination sizing gauge means and gap maintenance means of the present invention function to maintain a predetermined gap relationship between the work surface being honed and the shoes or movable elements of the electrically conductive tool 14, despite the constantly changing size of the workpiece surface. While the invention has been illustrated herein for use in finishing interior cylindrical surfaces, it will be understood that the invention is equally applicable to honing devices intended for the finishing of exterior surfaces and in which the honing stones would be advanced in a radially inward direction to contact the work surface. The air sizing apparatus of the present invention may also be operatively mounted to engage the sides of an exterior surface.

It will be understood that the abrasive means or honing stones employed in the invention may be either electrically conductive or electrically nonconductive. The electrochemical action deplates stock from the surface of a workpiece at a rate that is faster and more efficient than that achievable by conventional types of machining processes. Both the entire workpiece and supporting fixture are provided with a positive polarity and both the tool and the machine are provided with a negative polarity. The workpiece supporting fixture is electrically insulated from the machine structure.

The electrolyte may be heated or cooled, as desired. The electrolyte may be of any suitable type, as for example, a salt water solution. The electrolyte is forced through the space between the tool surface and the work surface at a suitable pressure to insure high velocity flow. The electrolyte conducts the current from the workpiece to the tool and flushes away the ionized material. The rate of stock removal is a function of the current density at the interface. The current employed depends on the size of the workpiece. For example, the current employed may be in the range of from 1000 amperes to 1500 amperes for a part surface of about ten square inches. The combination of the rotation and reciprocation motions insures that the stock removal is uniform over the full length of the work surface. The electrolytic action takes place throughout the complete work area because the entire tool functions as a cathode tool. The primary function of the abrasive means during the electrochemical cycle is to wipe away the residue left on the surface by the deplating action. The residue generated on the surface by the electrolytic action keeps the abrasive means dressed clean and cutting efficiently. By cutting off the flow of current for the last few seconds of the cycle, a clean cut, round and straight bore is left with the cross hatch pattern characteristic of honing. The combination electrochemical and mechanical action provides a resultant stock removal rate and surface generating characteristics which are superior to that obtainable by either a separate electrochemical machining process or a separate mechanical honing process.

The terms "electrochemical" and "electrolytic" are used synonymously in the specification and claims, and, as used herein, these terms mean the producing of chemical changes by the passage of an electric current through an electrolyte which results in the removal of metal from a workpiece by electrolysis and/or erosion of metal from a workpiece work surface.

Although many of the illustrative embodiments include a plurality of honing stones, gauging arms and spacer shoes, it will be understood that the princpiles of the present invention may be carried out by employing one honing stone, one gauging arm means, and one spacer shoe. The gap adapted to be maintained by the shoe or shoes depends upon the conditions in each particular case. For example, the gap between the spacer shoes and the work surface may be in the range of from .003" to .010". Other size gaps may also be employed in accordance with the particular work conditions.

Workpieces may be honed in accordance with the principles of the present invention in essentially a cool state, since very little heat is generated by the process. This is a highly important factor in the ability to hold close tolerances on roundness, straightness and concentricity.

It will be seen that the electrolyte escaping from the tool also provides a fluid means for moving the cathode elements or gauge arms outwardly into engagement with the work surface.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What we claim is:

1. In an apparatus for removing metal from the surface of a workpiece, the combination comprising:
   (a) a honing tool means including a tool body;
   (b) means for supporting a workpiece with a bore surface in a position with the longitudinal axis of the bore co-axially aligned with the longitudinal axis of said tool body;
   (c) abrasive means movably mounted on said tool body for abrading engagement with said bore surface;
   (d) means for flowing a fluid between said tool means and said bore surface of said workpiece;
   (e) means for moving said tool means and said abrasive means over said bore surface in a combined reciprocating and rotating motion to remove metal from said bore surface;
   (f) means for sensing the change in the size of the bore during a metal removing operation by said tool means and abrasive means and for producing a signal responsive to said change in the size of said bore; wherein,
      (1) said means for sensing the change in the size of said bore includes at least one gauge member having an elongated gauge arm pivotally mounted on said tool body and adapted to be moved radially outward by centrifugal force when said tool body is rotated;
   (g) a fluid pressure circuit means;
   (h) means actuated by said elongated gauge arm mounted in said tool body for changing the pressure in said fluid pressure circuit means to indicate the change in size of the bore during honing operation; and
   (i) means for terminating operation of said honing operation when proper bore size is attained.

2. In an apparatus for removing metal from the surface of a workpiece as defined in claim 1, wherein:
   (a) said fluid pressure circuit means includes an outlet nozzle disposed in said tool body; and
   (b) said elongated gauge arm is disposed in spaced relationship to said outlet nozzle in the flow path of pressurized fluid discharge from said nozzle, whereby when said gauge member is moved radially outward by centrifugal force as the bore size increases the elongated gauge arm will be moved relative to said outlet nozzle to vary the spacing between said gauge arm and said outlet nozzle to vary the pressure in the fluid pressure circuit mens.

3. In an apparatus for removing metal from the surface of a workpiece as defined in claim 2, wherein:
   (a) said outlet nozzle is disposed on the outer side of said elongated gauge arm, whereby when said gauge member is moved radially outward by centrifugal force as the bore size increases the elongated gauge arm will be moved toward said outlet nozzle to increase the pressure in the fluid pressure circuit means.

4. In an apparatus for removing metal from the surface of a workpiece as defined in claim 2, wherein:
   (a) said outlet nozzle is disposed on the inner side of said elongated gauge arm, whereby when said gauge member is moved radially outward by centrifugal force as the bore size increases the elongated gauge arm will be moved away from said outlet nozzle to decrease the pressure in the fluid pressure circuit means.

5. In an apparatus for removing metal from the surface of a workpiece as defined in claim 2, wherein:
   (a) said means for varying the pressure in the fluid pressure circuit includes an outlet nozzle mounted in said tool body, and said gauge member is disposed in spaced relationship to said outlet nozzle in the flow path of pressurized fluid discharged from said nozzle, whereby when the gauge member is moved said spaced relationship is varied and the pressure in the fluid pressure circuit means is varied.

6. In an apparatus for removing metal from the surface of a workpiece as defined in claim 2, wherein:
   (a) said means for varying the pressure in the fluid pressure circuit includes an outlet nozzle mounted in a block attached to said tool body, and said gauge member is disposed in spaced relationship to said outlet nozzle in the flow path of pressurized fluid discharged from said nozzle, whereby when the gauge member is moved said spaced relationship is varied and the pressure in the fluid pressure circuit means is varied.

7. In an apparatus for removing metal from the surface of a workpiece as defined in claim 2, wherein:
   (a) said gauge arm is provided with a plug which is secured therto and which extends radially outward therefrom and terminates in a position spaced apart from said outlet nozzle in the flow path of pressurized fluid discharged from said nozzle.

8. In an apparatus for removing metal from the surface of a workpiece as defined in claim 2, wherein:
   (a) said means for varying the pressure in the fluid pressure circuit includes a plug disposed between said gauge member and said outlet nozzle in a spaced relationship to said outlet nozzle and adapted to be engaged by and be moved by the gauge member to vary said spaced relationship and the pressure in the fluid pressure circuit means; and,
   (b) means for hingedly connecting said plug to the tool body.

9. In an apparatus for removing metal from the surface of a workpiece as defined in claim 8, wherein:
   (a) said means for hingedly connecting said plug to the tool body comprises a pair of spaced apart reed members.

10. In an apparatus for removing metal from the surface of a workpiece as defined in claim 1, wherein:
    (a) said means for moving said tool means in a rotating motion includes a power driven rotatable spindle;
    (b) said tool means is movably connected to said spindle to permit said tool means to float relative to the spindle; and,
    (c) said workpiece supporting means holds a workpiece in a rigid position.

11. In an apparatus for removing metal from the surface of a workpiece as defined in claim 1, wherein:
    (a) said fluid pressure circuit means includes an outlet nozzle disposed in said tool body; and,
    (b) said means mounted in said tool body for changing the pressure in said fluid pressure circuit means includes an elongated member slidably mounted in said tool body and having one end engaged with a sloping surface on said gauge member and the other end disposed in spaced relation to said outlet nozzle in the flow path of pressurized fluid discharging from said nozzle, whereby when said gauge member is moved radially outward by centrifugal force as the bore size increases, the elongated member will be moved relative to said outlet nozzle to vary the spacing between said other end of the elongated member and the outlet nozzle to vary the pressure in the fluid pressure circuit means.

12. In an apparatus for removing metal from the surface of a workpiece as defined in claim 11, wherein:
    (a) said sloping surface on said guage member slopes in a direction to move the elongated member toward said outlet nozzle as said gauge member moves radially outward under centrifugal force so as to decrease the pressure in the fluid pressure circuit means.

13. In an apparatus for removing metal from the surface of a workpiece as defined in claim 1, wherein:
    (a) said means for sensing the change in the size of the bore includes:
       (1) at least one gauge member movably mounted on said tool body in a slot;
       (2) a cathode element forming a part of said tool means carried on said gauge member;
       (3) nonconductive, nonwearing means mounted on said cathode element and adapted to engage the anode bore surface when the gauge member is biased radially outward;
    (b) said fluid means comprises an electrolyte adapted to flow between an anode bore surface and said cathode element;
    (c) means for passing a direct electric current from said anode bore surface to said cathode element on said tool means;
    (d) means mounted on said tool body and operated by said gauge member for varying the pressure in the fluid pressure circuit means to indicate the change in size of bore during an electrochemical honing operation; and
    (e) means for terminating current flow after a predetermined time of operation.

14. In an apparatus for removing metal from the surface of a workpiece as defined in claim 1, wherein:
    (a) said tool means includes at least one cathode element pivotally mounted in a slot formed in the surface of said tool body;
    (b) said cathode element is provided with a nonconductive, non-wearing means on the outer face thereof;
    (c) means is provided for moving said cathode element radially outward relative to said tool body and to move said nonconductive, nonwearing means into engagement with said bore surface to maintain said cathode tool means in a spaced apart relationship with the anode bore surface;
    (d) means for passing direct electric current from an anode bore surface to said cathode element on said tool means;

(e) said fluid means comprises an electrolyte adapted to flow between an anode bore surface and said cathode element; and (f) means for terminating current flow after a predetermined time of operation.

15. An electrochemical honing apparatus as defined in claim 14, wherein:
(a) said nonconductive, nonwearing means is adjustably mounted on said cathode element.

16. In an apparatus for removing metal from the surface of a workpiece as defined in claim 1, wherein said workpiece supporting means includes:
(a) a plate having a bore therethrough with an insulating sleeve fixed therein;
(b) means for locating a workpiece provided with a bore over said insulating sleeve; and
(c) means for clamping the workpiece against said plate.

17. In an apparatus for removing metal from the surface of a workpiece as defined in claim 16, wherein:
(a) said means for clamping the workpiece against the plate includes:
(1) a clamp arm pivotally mounted on said plate;
(2) spring means for biasing said clamp arm to an open position; and
(3) cam means for pivoting said clamp arm to a clamping position.

18. An electrochemical honing apparatus as defined in claim 13, wherein:
(a) said workpiece supporting means includes means for rotating an annular workpiece having a bore work surface; and
(b) said means for passing current from the bore work surface to the cathode tool body includes a pair of electrically conductive brushes carried on said workpiece supporting means and engageable with an annular workpiece as it is rotated.

19. An electrochemical honing apparatus as defined in claim 13, wherein:
(a) said gauge member includes an elongated gauge arm pivotally mounted to the tool body at a position between the ends of the gauge arm and having one end connected to said cathode element and the other end adapted to operate said means for varying the pressure in the fluid pressure circuit means; and
(b) said means for biasing said gauge member radially outward engages the other end of the gauge arm for pivoting the gauge arm to bias said one end of the gauge arm and said cathode element radially outward.

20. An electrochemical honing apparatus as defined in claim 13, wherein:
(a) said gauge member includes an elongated gauge arm having one end connected to said cathode element and other end connected by a pivot means to the tool body;
(b) said pivot means functions as the means for biasing the gauge member radially outward; and
(c) said means for varying the pressure in the fluid pressure circuit means is operated by said other end of the gauge arm.

21. An electrochemical honing apparatus as defined in claim 13, wherein:
(a) said gauge member includes an elongated gauge arm having one end hinged by reed means to the tool body and connected to said cathode element and the other end of the gauge arm is pivoted on a member adjustably connected to the tool body;
(b) said reed means functions as the means for biasing the gauge member radially outward; and
(c) said means for varying the pressure in the fluid pressure circuit means is operated by said other end of the gauge arm.

22. An electrochemical honing apparatus as defined in claim 13, wherein:
(a) said gauge member includes an elongated gauge arm having one end fixed to the tool body and the other end free and having a normal radial outward bias and connected to said cathode element;
(b) said gauge arm is provided with a notched out portion between said fixed end and the free end about which the free end pivots; and,
(c) said means for varying the pressure in the fluid pressure circuit means is operated by said gauge arm as said free end moves radially outward.

23. An electrochemical honing apparatus as defined in claim 13, wherein:
(a) said means for moving said cathode tool means in a rotating motion includes a power driven rotatable spindle to which said cathode tool means is connected; and,
(b) said means for sensing the change in size of the bore includes a fluid pressure circuit means comprising an outlet nozzle and a fluid passage formed through said spindle and through said tool body.

24. An electrochemical honing apparatus as defined in claim 14, wherein:
(a) said means for moving said cathode tool means in a rotating motion includes a power driven rotatable spindle to which said cathode tool means is connected; and,
(b) said means for sensing the change in size of the bore includes a fluid pressure circuit means comprising an outlet nozzle and a fluid pressure formed in a fixed housing through which said tool body extends and is rotatably mounted.

25. An electrochemical honing apparatus as defined in claim 14, wherein said means for passing a direct electric current from the anode bore surface to the cathode tool means includes:
(a) means for connecting the workpiece supporting means to the positive terminal of a direct electric current power supply; and,
(b) means for connnecting the cathode tool means to the negative terminal of a direct electric current power supply.

26. An electrochemical honing apparatus as defined in claim 25, wherein:
(a) said means for connecting the cathode tool means to the negative terminal of a direct electric current power supply includes an electric current brush means mounted on a fixed housing through which the tool body extends and is rotatably mounted, and the brush means is conductively engageable with the tool body.

27. An electrochemical honing apparatus as defined in claim 25, wherein:
(a) said means for moving said cathode tool means in a rotating motion includes a spindle housing in which is mounted a power driven rotatable spindle to which said cathode tool means is connected; and,
(b) said means for connecting the cathode tool means to the negative terminal of a direct electric current power supply includes an electric current brush means mounted on said spindle housing and conductively engageable with the tool body.

28. An electrochemical honing apparatus as defined in claim 14, wherein said workpiece supporting means includes:
(a) a plate having a bore therethrough with an insulating sleeve fixed therein;
(b) said means for locating the workpiece includes a pair of rotatably mounted pinions for locating a gear workpiece having an anode bore surface;
(c) said workpiece supporting means includes means for rotating the gear workpiece comprising a gear train meshed with one of said pinions for driving the same, and power means drivably connected to said gear train; and,
(d) said means for passing current from the bore surface to the cathode tool means includes a pair of electrically conductive brushes carried on said workpiece supporting means and engageable with said gear workpiece as it is rotated.

References Cited
UNITED STATES PATENTS

| | | | |
|---|---|---|---|
| 3,010,259 | 11/1961 | Greening | 51—34 |
| 3,058,895 | 10/1962 | Williams | 204—143 |
| 3,059,381 | 10/1962 | Greening et al. | 51—34 |
| 3,088,888 | 5/1963 | Leff | 204—143 |
| 3,156,808 | 11/1964 | Davies et al. | 219—69 |
| 3,183,176 | 5/1965 | Schwartz | 204—212 |
| 3,238,114 | 3/1966 | Halverstadt et al. | 204—224 |
| 3,257,306 | 6/1966 | Webb | 204—224 |
| 3,267,018 | 8/1966 | Greening | 204—143 |

OTHER REFERENCES

Horgan: "American Machinist/Metalworking Manufacturing," volume 106, No. 5, Mar. 5, 1962, pp. 81 and 82.

ROBERT K. MIHALEK, *Primary Examiner.*